United States Patent [19]
Keeler et al.

[11] Patent Number: 6,002,839
[45] Date of Patent: Dec. 14, 1999

[54] PREDICTIVE NETWORK WITH GRAPHICALLY DETERMINED PREPROCESS TRANSFORMS

[75] Inventors: James D. Keeler; Eric J. Hartman, both of Austin; Steven A. O'Hara, Round Rock; Jill L. Kempf; Devendra B. Godbole, both of Austin, all of Tex.

[73] Assignee: Pavilion Technologies, Austin, Tex.

[21] Appl. No.: 08/915,850

[22] Filed: Aug. 21, 1997

Related U.S. Application Data

[63] Continuation of application No. 08/576,581, Dec. 22, 1995, abandoned, which is a continuation of application No. 08/008,218, Jan. 25, 1993, Pat. No. 5,479,573, which is a continuation-in-part of application No. 07/980,664, Nov. 24, 1992, abandoned.

[51] Int. Cl.$^6$ .................................................... G06F 15/18
[52] U.S. Cl. ................................ 395/23; 395/11; 395/24
[58] Field of Search ................................ 395/21, 22, 23, 395/24, 11

[56] References Cited

U.S. PATENT DOCUMENTS

| | | | |
|---|---|---|---|
| 5,140,523 | 8/1992 | Frankel et al. | 364/420 |
| 5,150,313 | 9/1992 | Engh et al. | 364/569 |
| 5,175,797 | 12/1992 | Funabashi et al. | 395/22 |
| 5,255,347 | 10/1993 | Matsuba et al. | 395/23 |
| 5,335,291 | 8/1994 | Kramer et al. | 382/14 |

OTHER PUBLICATIONS

IJCNN International Joint Conference on Neural Networks; Kimoto et al., "Stock market prediction system with modular neural networks", pp. 1–2 vol.1, Jun. 1990.

*Primary Examiner*—Allen R. MacDonald
*Assistant Examiner*—Richemond Dorvil
*Attorney, Agent, or Firm*—Gregory M. Howison

[57] ABSTRACT

A predictive network is disclosed for operating in a runtime mode and in a training mode. The network includes a preprocessor (34') for preprocessing input data in accordance with parameters stored in a storage device (14') for output as preprocessed data to a delay device (36'). The delay device (36') provides a predetermined amount of delay as defined by predetermined delay settings in a storage device (18). The delayed data is input to a system model (26') which is operable in a training mode or a runtime mode. In the training mode, training data is stored in a data file (10) and retrieved therefrom for preprocessing and delay and then input to the system model (26'). Model parameters are learned and then stored in the storage device (22). During the training mode, the preprocess parameters are defined and stored in a storage device (14) in a particular sequence and delay settings are determined in the storage device (18). During the runtime mode, runtime data is derived from a distributed control system (24) and then preprocessed in accordance with predetermined process parameters and delayed in accordance with the predetermined delay settings. The preprocessed data is then input to the system model (26') to provide a predicted output, which is a control output to the distributed control system (24).

13 Claims, 17 Drawing Sheets

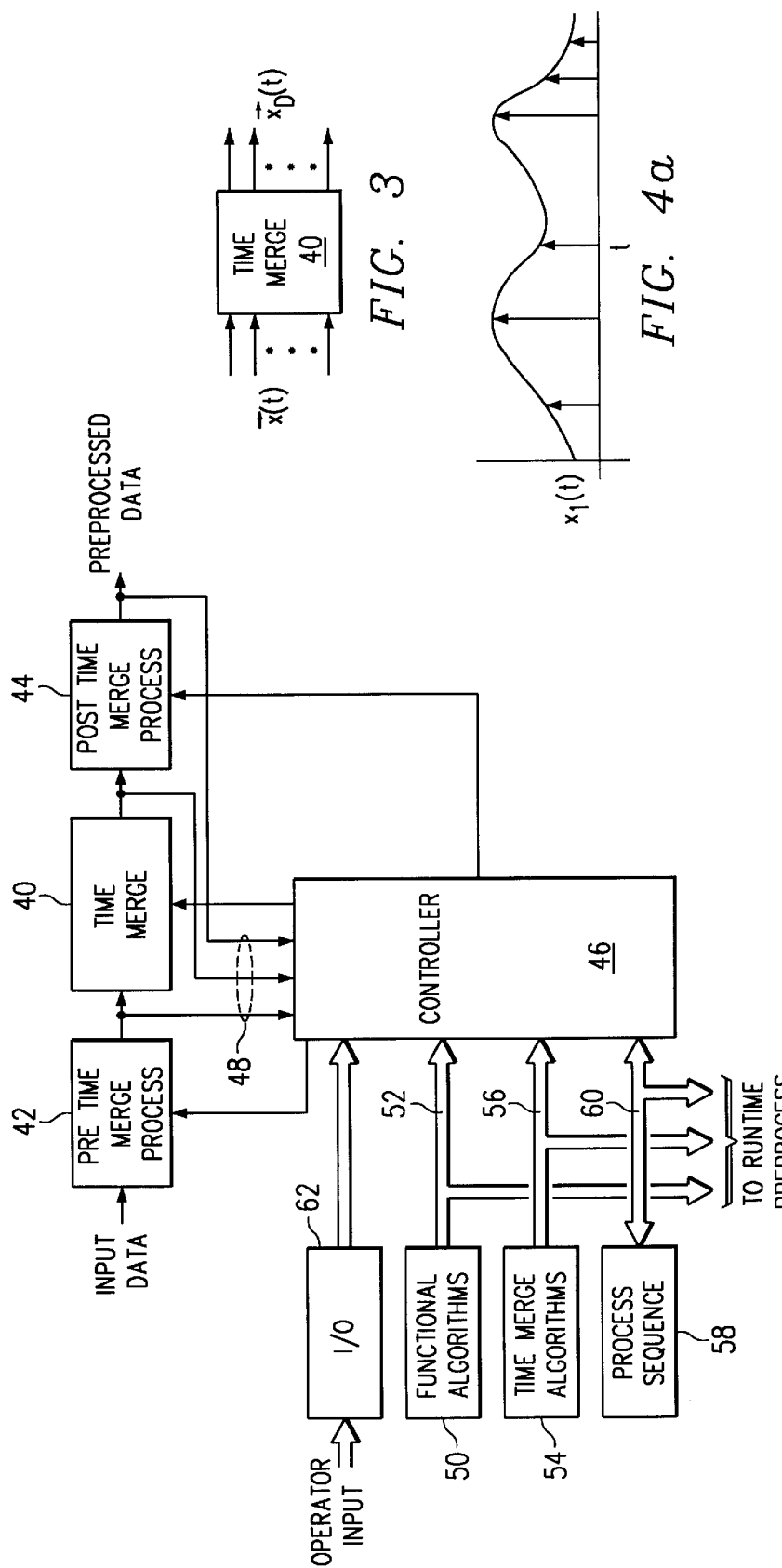
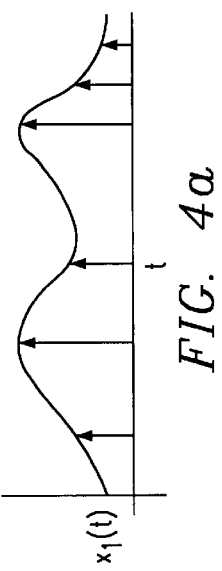
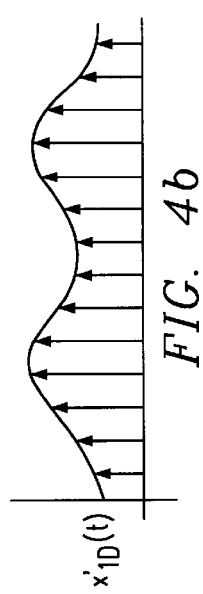

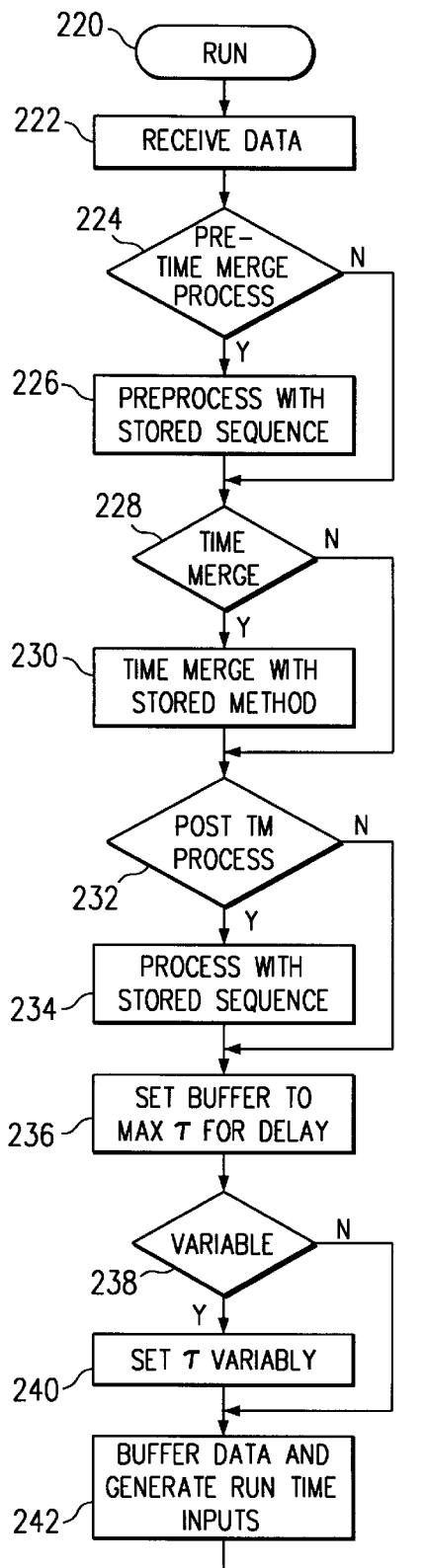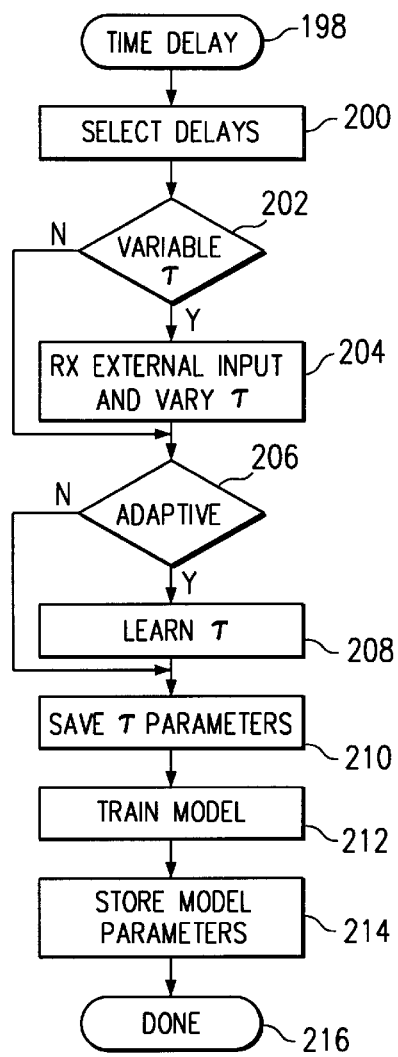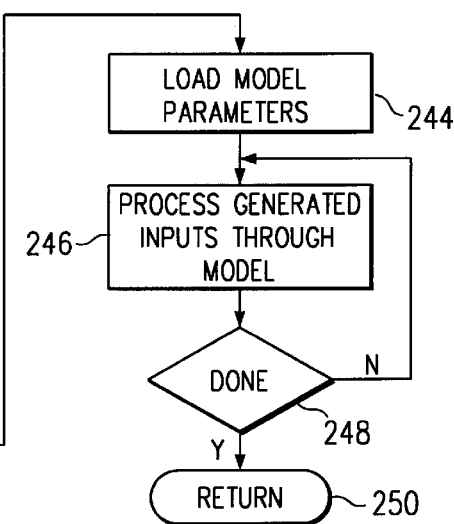
FIG. 17
FIG. 18

PREDICTIVE NETWORK WITH GRAPHICALLY DETERMINED PREPROCESS TRANSFORMS

CROSS REFERENCE TO RELATED APPLICATION

This application is a Continuation of application Ser. No. 08/576,581, filed Dec. 22, 1995, now abandoned, which is a continuation of application Ser. No. 008,218, filed Jan. 25, 1993, and issued Dec. 26, 1995, as U.S. Pat. No. 5,479,573, which is a continuation-in-part of U.S. patent application Ser. No. 980,664, filed Nov. 24, 1992, and entitled "Method and Apparatus for Training and/or Testing a Neural Network on Missing and/or Incomplete Data" now abandoned and related to co-pending U.S. patent application Ser. No. 08/008,170, filed Jan. 25, 1993, and entitled "Method and Apparatus for Preprocessing Input Data to a Neural Network".

TECHNICAL FIELD OF THE INVENTION

The present invention pertains in general to predictive system models, and more particularly, to processing of the data so as to account for time synchronization, time-delays, transforms and variable time-delays prior to input to a network for either training of the network or running of the network.

BACKGROUND OF THE INVENTION

A common problem that is encountered in training neural networks for prediction, forecasting, pattern recognition, sensor validation and/or processing problems is that some of the training/testing patterns might be missing, corrupted, and/or incomplete. Prior systems merely discarded data with the result that some areas of the input space may not have been covered during training of the neural network. For example, if the network is utilized to learn the behavior of a chemical plant as a function of the historical sensor and control settings, these sensor readings are typically sampled electronically, entered by hand from gauge readings and/or entered by hand from laboratory results. It is a common occurrence that some or all of these readings may be missing at a given time. It is also common that the various values may be sampled on different time intervals. Additionally, any one value may be "bad" in the sense that after the value is entered, it may be determined by some method that a data item was, in fact, incorrect. Hence, if the data were plotted in a table, the result would be a partially filled-in table with intermittent missing data or "holes", these being reminiscent of the holes in Swiss cheese. These "holes" correspond to "bad" or "missing" data. The "Swiss-cheese" data table described above occurs quite often in real-world problems.

Conventional neural network training and testing methods require complete patterns such that they are required to discard patterns with missing or bad data. The deletion of the bad data in this manner is an inefficient method for training a neural network. For example, suppose that a neural network has ten inputs and ten outputs, and also suppose that one of the inputs or outputs happens to be missing at the desired time for fifty percent or more of the training patterns. Conventional methods would discard these patterns, leading to training for those patterns during the training mode and no reliable predicted output during the run mode. This is inefficient, considering that for this case more than ninety percent of the information is still there for the patterns that conventional methods would discard. The predicted output corresponding to those certain areas will be somewhat ambiguous and erroneous. In some situations, there may be as much as a 50% reduction in the overall data after screening bad or missing data. Additionally, experimental results have shown that neural network testing performance generally increases with more training data, such that throwing away bad or incomplete data decreases the overall performance of the neural network.

In addition to the above, when data is retrieved on different time scales, it is necessary to place all of the data on a common time scale. However, this is difficult in that for a given time scale, another and longer time scale results in missing data at that position. For example, if one set of data were taken on an hourly basis and another set of data were taken on a quarter hour basis, there would be three areas of missing data if the input time scale is fifteen minutes. This data must be filled in to assure that all data is presented at synchronized times to the system model. Worse yet, the data sample periods may be non-periodic, producing totally asynchronous data.

In addition, this data may be taken on different machines in different locations with different operating systems and quite different data formats. It is essential to be able to read all of these different data formats, keeping track of the data value and the time-stamp of the data out to one or more "flat files" which are column oriented, each column corresponding to a data variable and/or the data/time stamp of the variable. It is a formidable task to retrieve this data keeping track of the date-time information and read it into an internal data-table (spreadsheet) so that the data can be time merged.

Another aspect of data integrity is that with respect to inherent delays in a system. For example, in a chemical processing system, a flow meter output can provide data at time $t_0$ at a given value. However, a given change in flow resulting in a different reading on the flow meter may not affect the output for a predetermined delay $\tau$. In order to predict what the output would be, this flow meter output must be input to the network at a delay equal to $\tau$. This must also be accounted for in the training of the network. In generating data that accounts for time delays, it has been postulated that it would be possible to generate a table of data that comprises both original data and delayed data. This necessitates a significant amount of storage in order to store all of the delayed data and all of the original data, wherein only the delayed data is utilized. Further, in order to change the value of the delay, an entirely new set of input data must be generated off the original set.

The present invention disclosed and claimed herein comprises a system for controlling the operation of the plant. The system includes a control network for generating plant inputs to control the plant and a run-time model. The run-time model is operable to receive inputs and then map the received inputs through a stored representation of the plant to a predicted output. The predicted output provides control inputs for input to the control system. A run-time preprocessor is operable to apply run-time transforms to the generated inputs received from the control network prior to input to the run-time model. These allow preprocessing of the inputs. A simulation network is provided for determining the transforms to be applied to the inputs prior to input to the run-time model in an off-line mode. Once determined, these off-line transforms are then utilized to modify the transforms in the run-time preprocessor such then these transforms can be applied to the run-time model.

In a further aspect of the present invention, a graphical interface is provided to allow the user access to the modification operation in the off-line mode. The simulation network includes an off-line preprocessor that is substantially similar to the run-time preprocessor. A database is provided for storing data obtained from the plant during running thereof, which data can be input to the off-line preprocessor. An off-line model is provided that is substantially similar to the run-time model and is operable to receive the output of the off-line preprocessor. The off-line preprocessor is operable to apply user defined transforms to the data from the database prior to input to the off-line model. A control system is provided for allowing the user via the graphical interface to modify and define the transforms in the off-line preprocessor. The graphical interface allows the user to display the data as a function of time and to graphically modify the data to obtain the desired result. The graphically modified data can then be converted into a transform for application to the off-line model as a transform.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a detailed block diagram of the preprocessor in the training mode;

FIG. 3 illustrates a simplified block diagram of the time merging operation, which is part of the preprocessing operation;

FIGS. 4a and 4b illustrate data blocks of the before and after time merging operation;

FIG. 17 illustrates a flowchart depicting the time delay operation;

FIG. 18 illustrates a flowchart depicting the run mode operation;

DETAILED DESCRIPTION OF THE INVENTION

Figure 1:
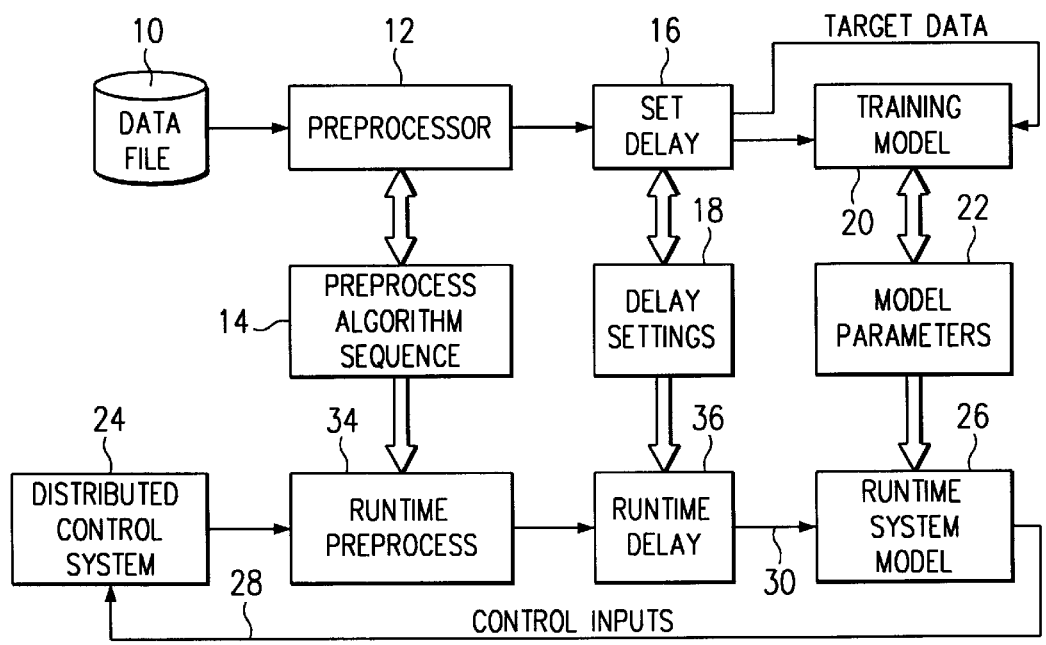
FIG. 1 illustrates an overall block diagram of the system for both preprocessing data during the training mode and for preprocessing data during the run mode.

Referring now to FIG. 1, there is illustrated an overall block diagram of the data preprocessing operation in both the training mode and the run time mode. In the training mode, one of more data files 10 are provided, which data files include both input training data and output training data. The training data is arranged in "sets", which sets correspond to different plant variables, and which may be sampled at different time intervals. This data is referred to as the "raw" data. When the data is initially presented to an operator, the data is typically unformatted, i.e., each set of data is in the form that it was originally received. Although not shown, the operator will first format the data files so that all of the data files can be merged into a data-table or spreadsheet, keeping track of the original "raw" time information. This is done in such a manner as to keep track of the time stamp for each variable. Thus, the "raw" data is organized as time, value pairs of columns; that is, for each variable $x_i$, there is its associated time of sample $t_i$. The data can then be grouped into sets $\{x_i, t_i\}$.

If any of the time-vectors happen to be identical, it is convenient to arrange the data such that the data will be grouped in common time scale groups, and data that is on, for example, a fifteen minute sample time scale will be grouped together and data sampled on a one hour sample time scale will be grouped together. However, any type of format that provides viewing of multiple sets of data is acceptable.

The data is input to a preprocessor 12 that functions to perform various preprocessing functions, such as reading bad data, reconciling data to fill in bad or missing data, and performing various algorithmic or logic functions on the data. Additionally, the preprocessor 12 is operable to perform a time merging operation, as will be described hereinbelow. During operation, the preprocessor 12 is operable to store various preprocessing algorithms in a given sequence in a storage area 14. As will be described hereinbelow, the sequence defines the way in which the data is manipulated in order to provide the overall preprocessing operation.

After preprocessing by the preprocessor 12, the preprocessed data is input to a delay block 16, the delay block 16 operable to set the various delays for different sets of data. This operation can be performed on both the target output data and the input training data. The delay settings are stored in a storage area 18 after determination thereof.

The output of the delay block 16 is input to a training model 20. The training model 20 is a non-linear model that receives input data and compares it with target output data and trains the network to generate a model for predicting the target output data from the input data. In the preferred embodiment, the training model utilizes a multi-layered neural network that is trained on one of multiple methods, one being Back Propagation. Various weights within the network are set during the Back Propagation training operation, and these are stored as model parameters in a storage area 22. The training operation and the neural network are conventional systems.

A Distributed Control System (DCS) 24 is provided that is operable to generate various system measurements and control settings representing system variables such as temperature, flow rates, etc., that comprise the input data to a system model. The system model can either generate control inputs for control of the DCS 24 or it can provide a predicted output, these being conventional operations. This is provided by a run time system model 26, which has an output 28 and an input 30. The input 30 is comprised of the preprocessed and delayed data and the output can either be a predictive output, or a control input to the DCS 24. In the embodiment of FIG. 1, this is illustrated as control inputs to the DCS 24. The run time system model 26 is utilizing the model parameters stored in the storage area 22. It should be noted that the run time system model 26 contains a representation learned during the training operation, which representation was learned on the preprocessed data. Therefore, data generated by the DCS 24 must be preprocessed in order to correlate with the representation stored in the run time system model 26.

The DCS 24 has the data output thereof input to a run time preprocess block 34, which is operable to process the data in accordance with the sequence of preprocessing algorithms stored in the storage area 14, which were generated during the training operation. The output of the run time preprocessor 34 is input to a run time delay box 36 to set delays on the data in accordance with the delay settings stored in the storage area 18. This provides the overall preprocessed data output on the line 34 input to the run time system model 26.

Figure 1A:
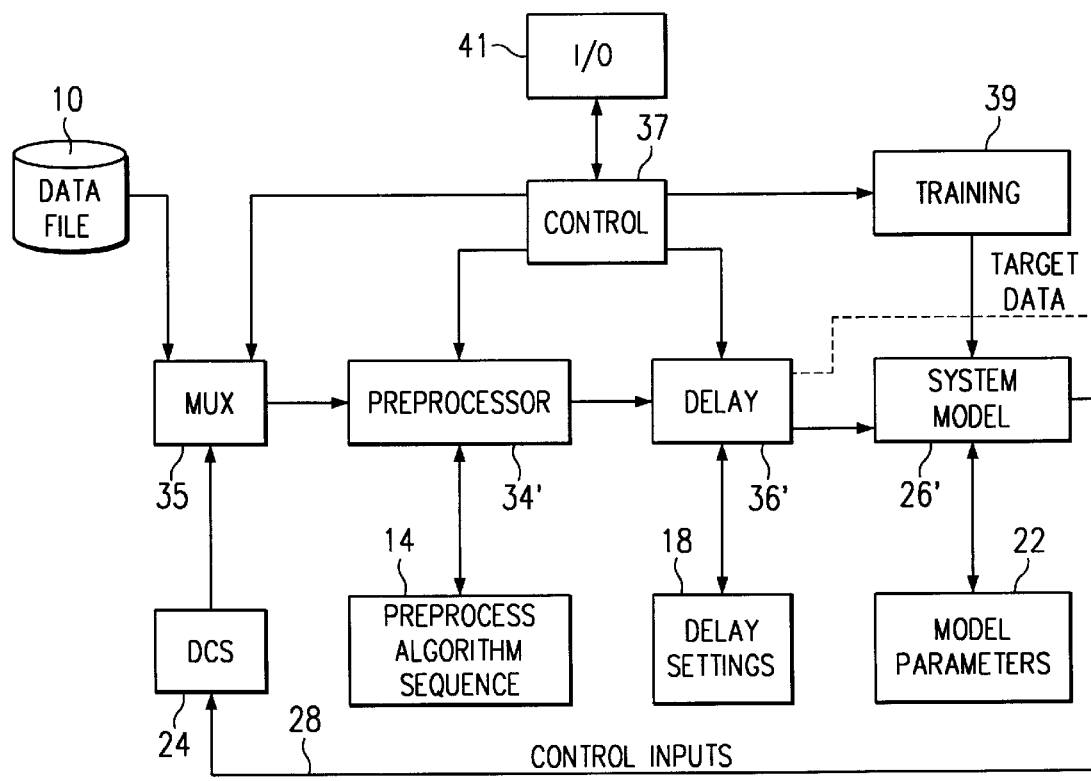
FIG. 1a illustrates a simplified block diagram of the system of FIG. 1.

Referring now to FIG. 1a, there is illustrated a simplified block diagram of the system of FIG. 1, wherein a single preprocessor 34' and a single delay 36' are utilized. The output of the delay 36' is input to a single system model 26'. In operation, the preprocessor 34', the delay 36' and the system model 26' operate in both a training mode and a run-time mode. A multiplexer 35 is provided that receives the output from the data file(s) 10 and the output of the DCS 24, this providing plant variables of the DCS 24, the output of the multiplexer input to the preprocessor 34'. A control device 37 is provided that controls the multiplexer 35 to select either a training mode or a run-time mode. In the training mode, the data file(s) 10 has the output thereof selected by a multiplexer and the preprocessor 34' is operable to preprocess the data in accordance with a training mode, i.e., the preprocessor 34' is utilized to determine what the predetermined algorithm sequence is that is stored in the storage area 14. An input/output device I/O 41 is provided for allowing the operator to interface with the control device 37. The delay 36' is also controlled by the control device 37 to determine the delay settings for storage in the storage area 18. The system model 26' is operated in a training mode such that the target data and the input data to the system model 26' are generated, the training controlled by training block 39. The training block 39 is operable to select one of multiple training algorithms, such as back propagation, for training of the system model 26'. The model parameters are stored in the storage area 22.

After training, the control device 37 places the system in a run-time mode such that the preprocessor 34' is now operable to apply the algorithm sequence in the storage area 14 to the data selected by the multiplexer 35 from the DCS 24. After the algorithm sequence is applied, the data is output to the delay block 36', which introduces the various delays in the storage area 18, and then these are input to the system model 26' which then operates in a predictive mode to either predict an output or to predict control inputs for the DCS 24.

Referring now to FIG. 2, there is illustrated a more detailed block diagram of the preprocessor 12 utilized during the training mode. In general, there are three stages to the preprocessing operation. The central operation is a time merge operation, represented by block 40. However, prior to performing a time merge operation on the data, a pre-time merge process is performed, as indicated by block 42. After the time merge operation, the data is subjected to a post-time merge process, as indicated by block 44. The output of the post-time merge process block 44 provides the preprocessed data for input to the delay block 16.

A controller 46 is provided for controlling the process operation of the blocks 40–44, the outputs of which are input to the controller 46 on lines 48. The controller 46 is interfaced with a functional algorithm storage area 50 through a bus 52 and a time merge algorithm 54 through a bus 56. The functional algorithm storage area 50 is operable to store various functional algorithms that can be mathematical, logical, etc., as will be described hereinbelow. The time merge algorithm storage area 54 is operable to contain various time merge formats that can be utilized, such as extrapolation, interpolation or a boxcar method. A process sequence storage area 58 is provided that is operable to store the sequence of the various processes that are determined during the training mode, these interfaced with a bidirectional bus 60. During the training mode, the controller 46 determines which of the functional algorithms are to be applied to the data and which of the time merge algorithms are to be applied to the data in accordance with instructions received from an operator input through an input/output device 62. During the run time mode, the process sequence in the storage area 58 is utilized to apply the various functional algorithms and time merge algorithms to input data.

Referring now to FIG. 3, there is illustrated a simplified block diagram of a time merge operation. All of the input data $x_D(t)$ is input to the time merge block 40 to provide time merge data $x_D'(t)$ on the output thereof. Although not shown, the output target data y(t) is also processed through the time merge block 40 to generate time merged output data y'(t).

Referring now to FIGS. 4a and 4b, there are illustrated data blocks of one input data set $x_1(t)$ and the resulting time merged output $x_1'(t)$. It can be seen that the waveform associated with $x_1(t)$ has only a certain number, n, of sample points associated therewith. The time-merge operation is a transform that takes one or more columns of data, $x_i(t_i)$, such as that shown in FIG. 4a, with $n_i$ time samples at times $t_i'$. That is, the time-merge operation is a function, $\Omega$, that produces a new set of data $\{x'\}$ on a new time sale t' from the given set of data x(t) sampled at t.

$$\{\bar{x}';\bar{t}'\}=\Omega\{\bar{x},\bar{t}\} \tag{1}$$

This function is done via a variety of conventional extrapolation, interpolation, or box-car algorithms and is represented as a C-language callable function as:

$$\text{return=time-merge}(\bar{x}_1,\bar{x}_2,\ldots,\bar{x}_k,t_1,t_2,\ldots t_k,x_1',x_2',\ldots x_k',t') \tag{2}$$

where $x_i$, $t_i$ are vectors of the old values and old times; $x_i'$ ... $x_k'$ are vectors of the new values; and t' is the new time-scale vector.

Figure 5A:
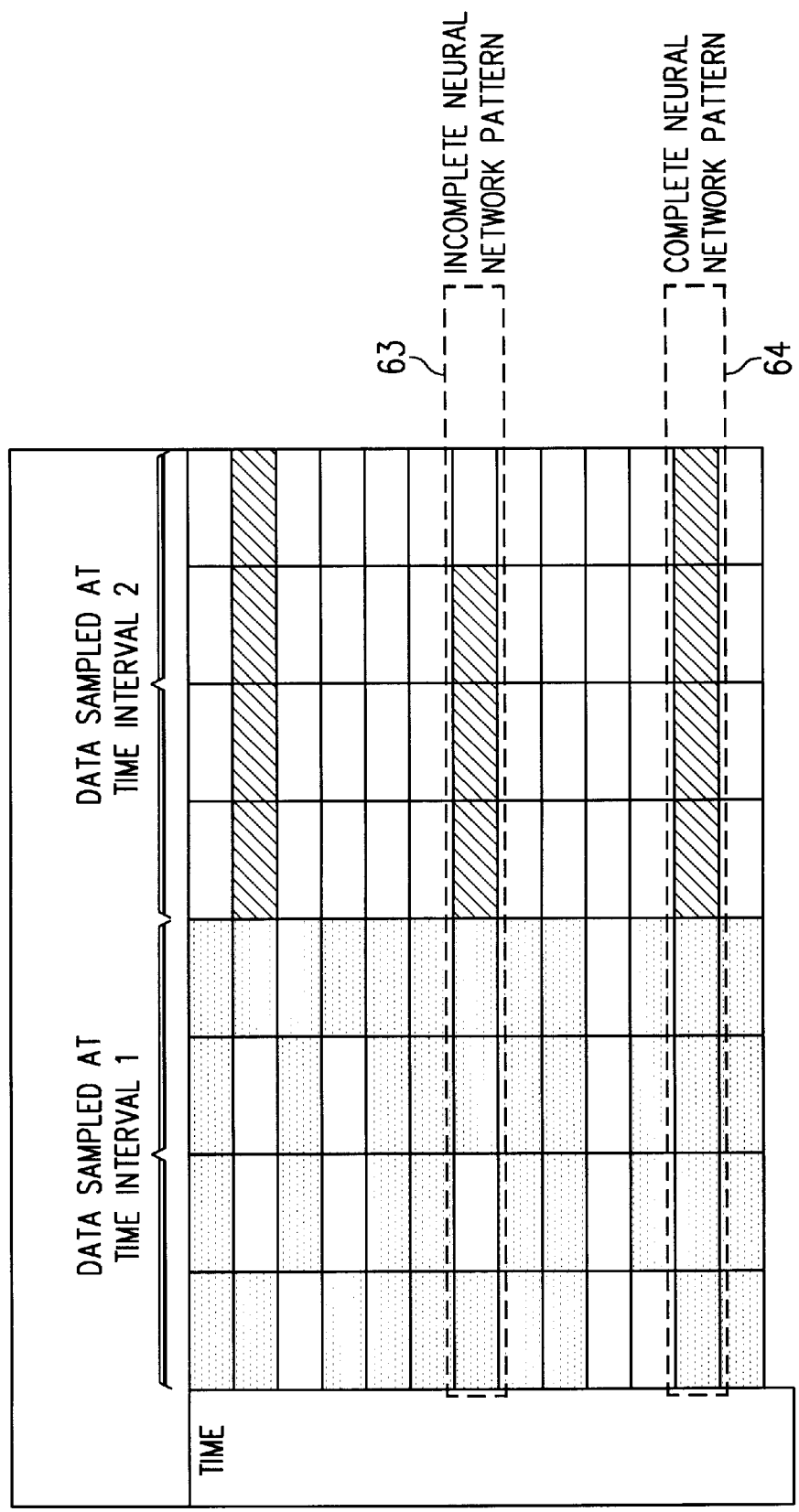
FIGS. 5a–5c illustrate a diagrammatic view of the time merging operation.

Referring now to FIG. 5a, there is illustrated a data table with bad, missing, or incomplete data. The data table consists of data with time disposed along a vertical scale and the samples disposed along a horizontal scale. Each sample comprises many different pieces of data with two data intervals illustrated. It can be seen that when the data is examined for both the data sampled at the time interval "1" and the data sampled at the time interval "2", that some portions of the data result in incomplete patterns. This is illustrated by a dotted line 63, where it can be seen that some data is missing in the data sampled at time interval "1" and some is missing in time interval "2". A complete neural network pattern is illustrated box 64, where all the data is complete. Of interest is the time difference between the data sampled at time interval "1" and the data sampled at time interval "2". In time interval "1", the data is essentially present for all steps in time, whereas data sampled at time interval "2" is only sampled periodically relative to data sampled at time interval "1". As such, a data reconciliation procedure is implemented that fills in the missing data and also reconciles between the time samples in time interval "2" such that the data is complete for all time samples for both time interval "1" and time interval "2".

The neural network models that are utilized for time-series prediction and control require that the time-interval between successive training patterns be constant. Since the data that comes in from real-world systems is not always on the same time scale, it is desirable to time-merge the data before it can be used for training or running the neural network model. To achieve this time-merge operation, it may be necessary to extrapolate, interpolate, average or compress the data in each column over each time-region so as to give an input value x'(t) that is on the appropriate time-scale. All of these are referred to as "data reconciliation". The reconciliation algorithm utilized may include linear estimates, spline-fit, boxcar algorithms, etc. If the data is sampled too frequently in the time-interval, it will be necessary to smooth or average the data to get a sample on the desired time scale. This can be done by window averaging techniques, sparse-sample techniques or spline techniques.

In general, x'(t) is a function of all of the raw values x(t) given at present and past times up to some maximum past time, Xmax, That is, $$\bar{x}'(t)=f(x_1(t_N),x_2(t_N), \ldots x_n(t_N);x_1(t_{N-1}),x_1(t_{N-2}) \ldots x_1(t_{N-1});x_1(t_1), x_2(t_1) \ldots x_n(t_1)) \qquad (3)$$

where some of the values of $x_i(t_j)$ may be missing or bad.

This method of finding x'(t) using past values is strictly extrapolation. Since the system only has past values available during runtime mode, the values must be reconciled. The simplest method of doing this is to take the next extrapolated value $x'_i(t)=x_i(t_N)$; that is, take the last value that was reported. More elaborate extrapolation algorithms may use past values $x_i(t-\tau_{ij})$, $j \in t(o, \ldots i_{max})$. For example, linear extrapolation would use:

$$x_i(t) = x_i(t_{N-1}) + \left[\frac{x_i(t_N) - x_i(t_{N-1})}{t_N - t_{N-1}}\right] t; t > t_N \qquad (4)$$

Polynomial, spline-fit or neural-network extrapolation techniques use Equation 3. (See eg. W. H. Press, "Numerical Recipes", Cambridge University Press (1986), pp. 77–101) Training of the neural net would actually use interpolated values, i.e., Equation 4, wherein the case of interpolation $t_N > t$.

Figure 5B:
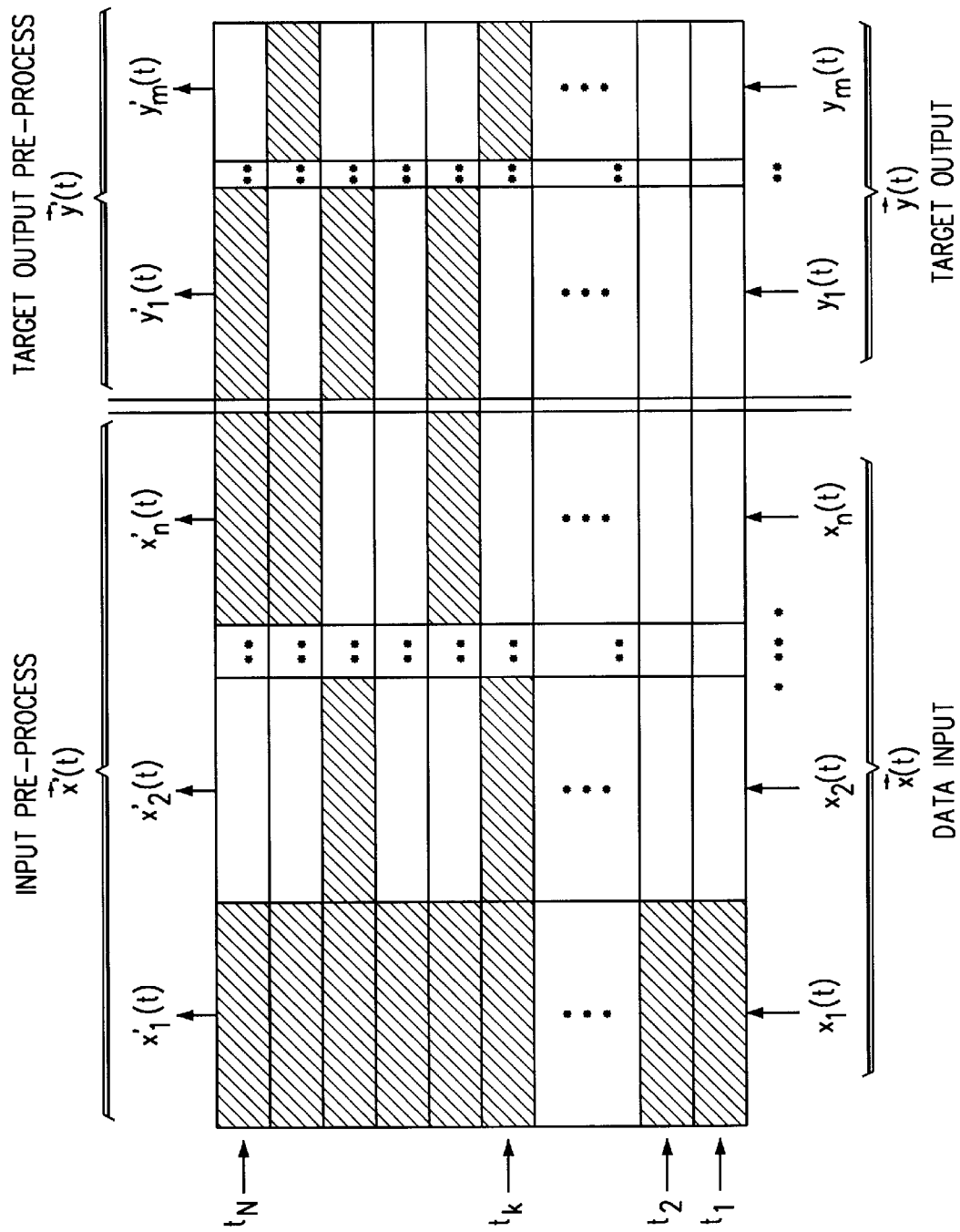

Referring now to FIG. 5b, there is illustrated an input data pattern and target output data pattern illustrating the pre-process operation for both preprocessing input data to provide time merged output data and also pre-processing the target output data to provide pre-processed target output data for training purposes. The data input x(t) is comprised of a vector with many inputs, $x_1(t)$, $x_2(t)$, ... $x_n(t)$, each of which can be on a different time scale. It is desirable that the output x'(t) be extrapolated or interpolated to insure that all data is present on a single time scale. For example, if the data at $x_1(t)$ were on a time scale of one sample every second, a sample represented by the time $t_k$, and the output time scale were desired to be the same, this would require time merging the rest of the data to that time scale. It can be seen that the data $x_2(t)$ occurs approximately once every three seconds, it also being noted that this may be asynchronous data, although it is illustrated as being synchronized. The data buffer in FIG. 4b is illustrated in actual time. The reconciliation could be as simple as holding the last value of the input $x_2(t)$ until a new value is input thereto, and then discarding the old value. In this manner, an output will always exist. This would also be the case for missing data. However, a reconciliation routine as described above could also be utillzed to insure that data is always on the output for each time slice of the vector x'(t). This also is the case with respect to the target output which is preprocessed to provide the preprocessed target output y'(t).

Figure 5C:
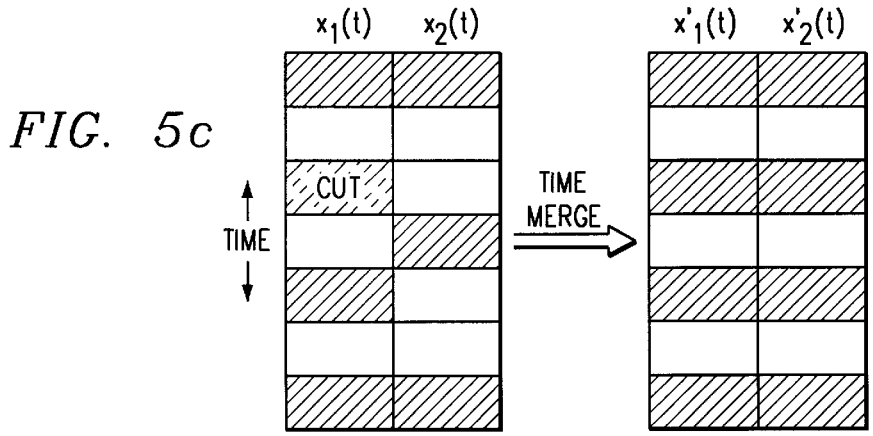

Referring now to FIG. 5c, there is illustrated the preferred embodiment of performing the time merge. Illustrated are two formatted tables, one for two sets of data $x_1(t)$ and $x_2(t)$. This is set up such that the data set for $x_1(t)$ is illustrated as being on one time scale and the data $x_2(t)$ is on a different time scale. Additionally, one value of the data set $x_1(t)$ is illustrated as being bad, which piece of bad data is "cut" from the data set, as will be described hereinbelow. The operation in the preprocessing mode fills in this bad data and then time merges it. In this example, the time scale for $x_1(t)$ is utilized as a time scale for the time merge data such that the time merge data $x_1'(t)$ is on the same time scale with the "cut" value filled in as a result of the preprocessing operation and the data set $x_2(t)$ is processed in accordance with one of the time merged algorithms to provide data for $x_2'(t)$ and on the same time scale as the data $x_1'(t)$. These algorithms will be described in more detail hereinbelow.

Figure 6:
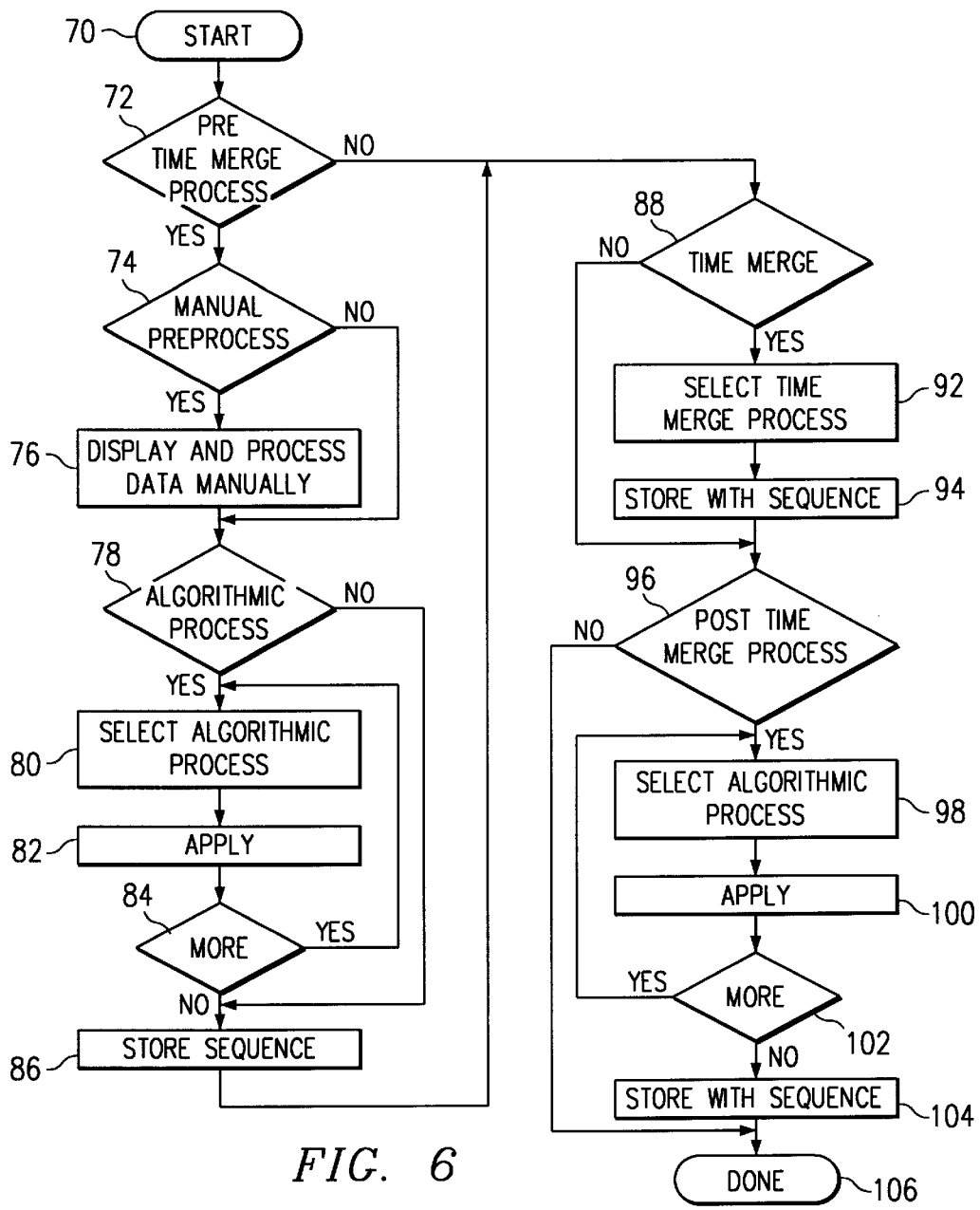
FIG. 6 illustrates a flowchart depicting the preprocessing operation.

Referring now to FIG. 6, there is illustrated a flowchart depicting the preprocessing operation. The flow chart is initiated at a start block 70 and then proceeds to a decision block 72 to determine if there are any pre-time merge process operations. If so, the program flows to a decision block 74 to determine whether there are any manual pre-process operations to be performed. If so, the program flows along the "Y" path to a function block 76 to manually preprocess the data. In manual preprocessing of data, the data is viewed in a desired format by the operator and the operator can look at the data and eliminate, "cut" or otherwise modify obviously bad data values. This is to be compared to the automatic operation wherein all values are subjected to a predetermined algorithm to process the data. For example, if the operator noticed that one data value is significantly out of range with the normal behavior of the remaining data, this data value can be "cut" such that it is no longer present in the data set and thereafter appears as missing data. However, an algorithm could be generated that either cuts out all data above a certain value or clips the values to a predetermined maximum. The clipping to a predetermined maximum is an algorithmic operation that is described hereinbelow.

After displaying and processing the data manually, the program flows to a decision block 78. Additionally, if the manual preprocess operation is not utilized, the program flows from the decision block 74 along the "N" path to the input of decision block 78. The decision block 78 is operable to determine whether an algorithmic process is to be applied to the data. If so, the program flows along a "Y" block to a function block 80 to select a particular algorithmic process for a given set of data. After selecting the algorithmic process, the program flows to a function block 82 to apply the algorithm process to the data and then to a decision block 84 to determine if more data is to be processed with the algorithmic process. Now the program flows back around to the input of the function block 80 along a "Y" path. Once all data has been subjected to the desired algorithmic processes, the program flows along a "N" path from decision block 84 to a function block 86 to store the sequence of algorithmic processes such that each data set has the desired algorithmic processes applied thereto in the sequence. Additionally, if the algorithmic process is not selected by the decision block 78, the program flows along an "N" path to the input of the function block 86.

After the sequence is stored in the function block 86, the program flows to a decision block 88 to determine if a time merge operation is to be performed. The program also flows along an "N" path from the decision block 72 to the input of decision block 88 if the pre-time-merge process is not required. The program flows from the decision block 88 along the "Y" path to a function block 92 if the time merge process has been selected, and then the time merge operation performed. The time merge process is then stored with the sequence as part thereof. The program then flows to the input of a decision block 96 to determine whether the post time merge process is to be performed. If the post time merge process is not performed, as determined by the decision block 88, the program flows along the "N" path therefrom to the decision block 96. If the post time merge process is to be performed, the program flows along the "Y" path from the decision block 96 to the input of a function block 98 to select the algorithmic process and then to a function block 100 to apply the algorithmic process to the desired set of data and then to a decision block 102 to determine whether additional sets of data are to be processed in accordance with the algorithmic process. If so, the program flows along the "Y" path back to the input of function block 98, and if not, the program flows along the "N" path to a function block 104 to store the new sequence of algorithmic processes with the sequence and then to a DONE block 106. If the post time merge process is not to be performed, the program flows from the decision block 96 along the "N" path to the input of the DONE block 106.

Figure 7A:
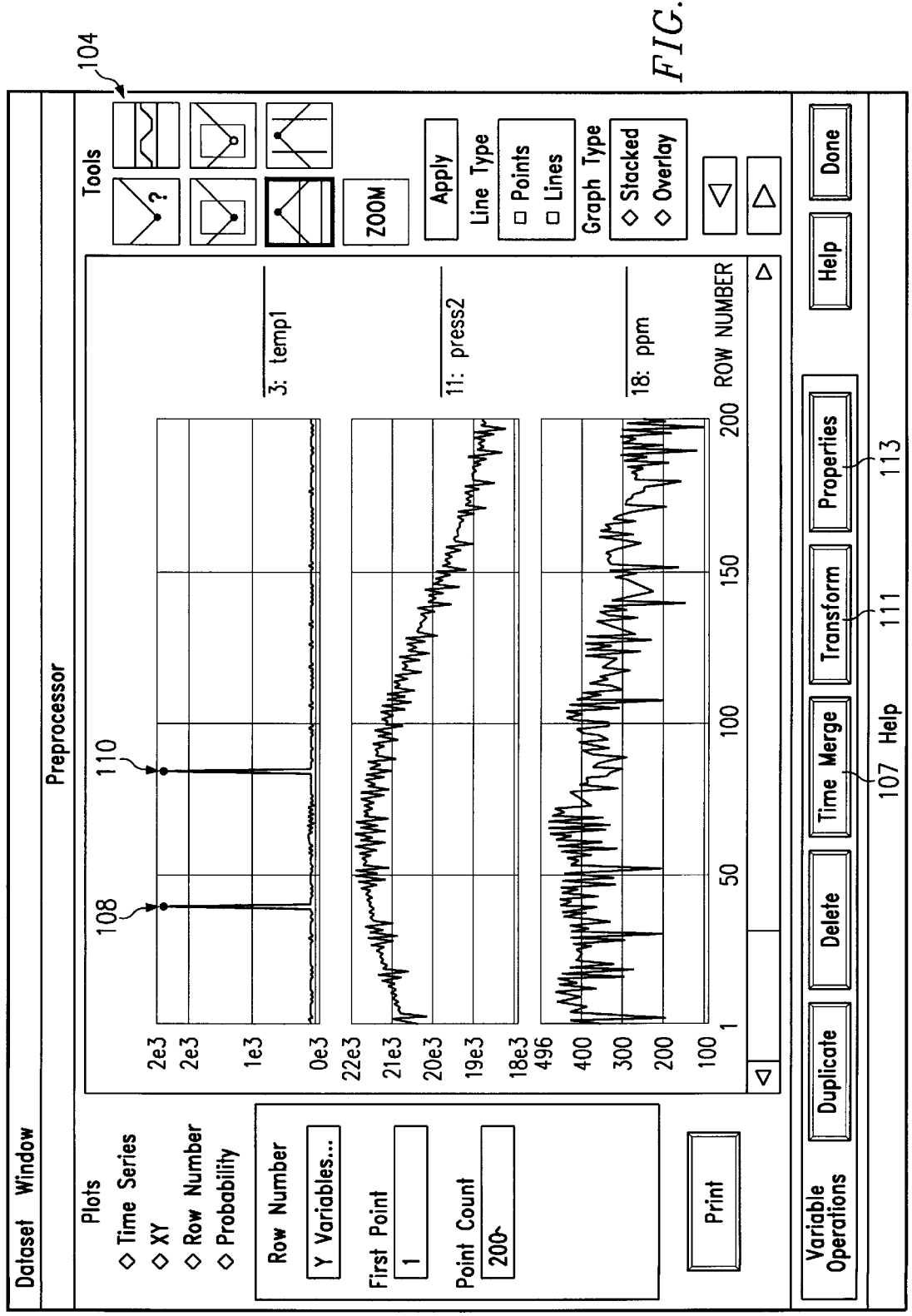
FIGS. 7a–7f illustrate the use of graphical tools for cleaning up the "raw" data.
Figure 7B:
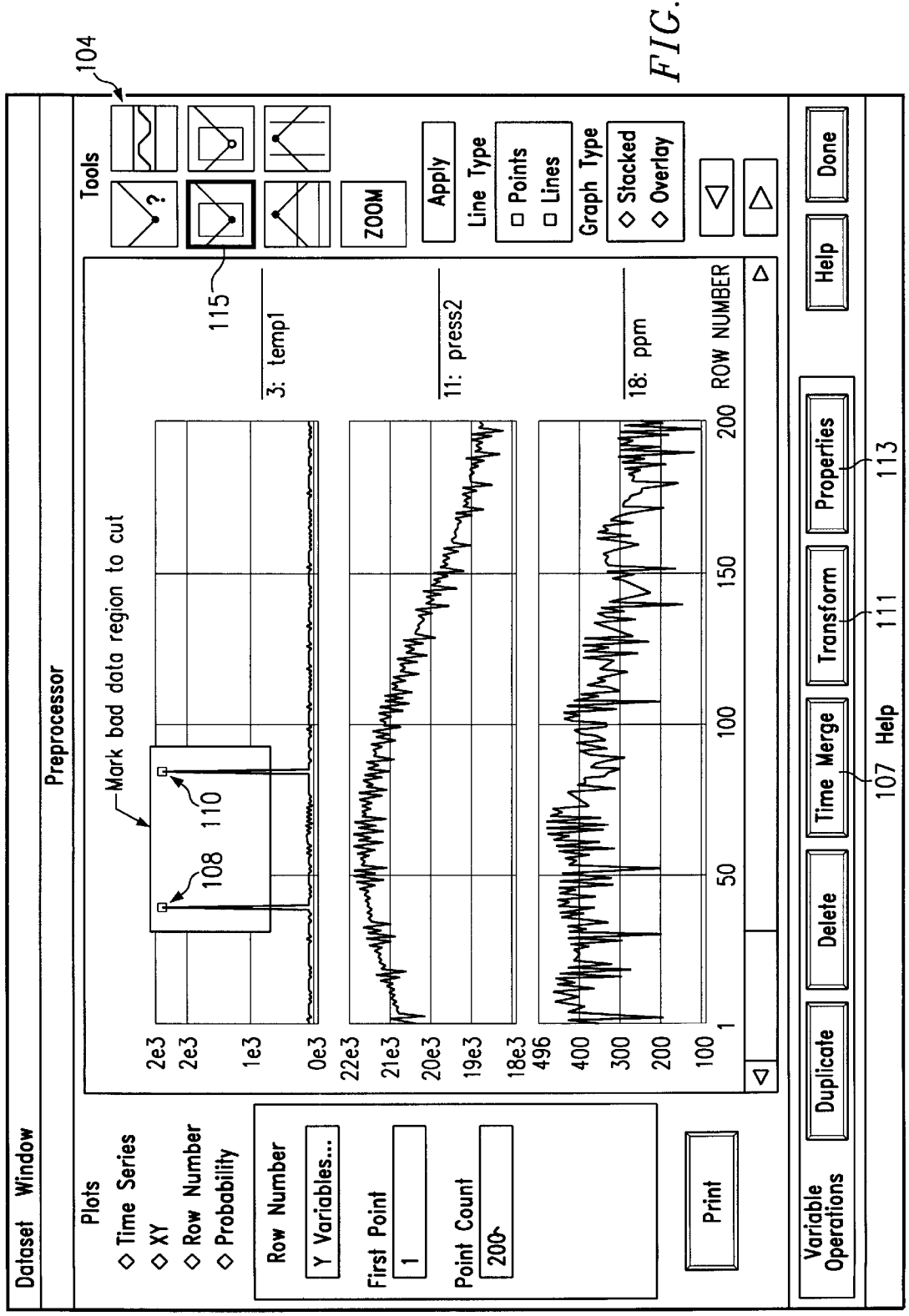
Figure 7C:
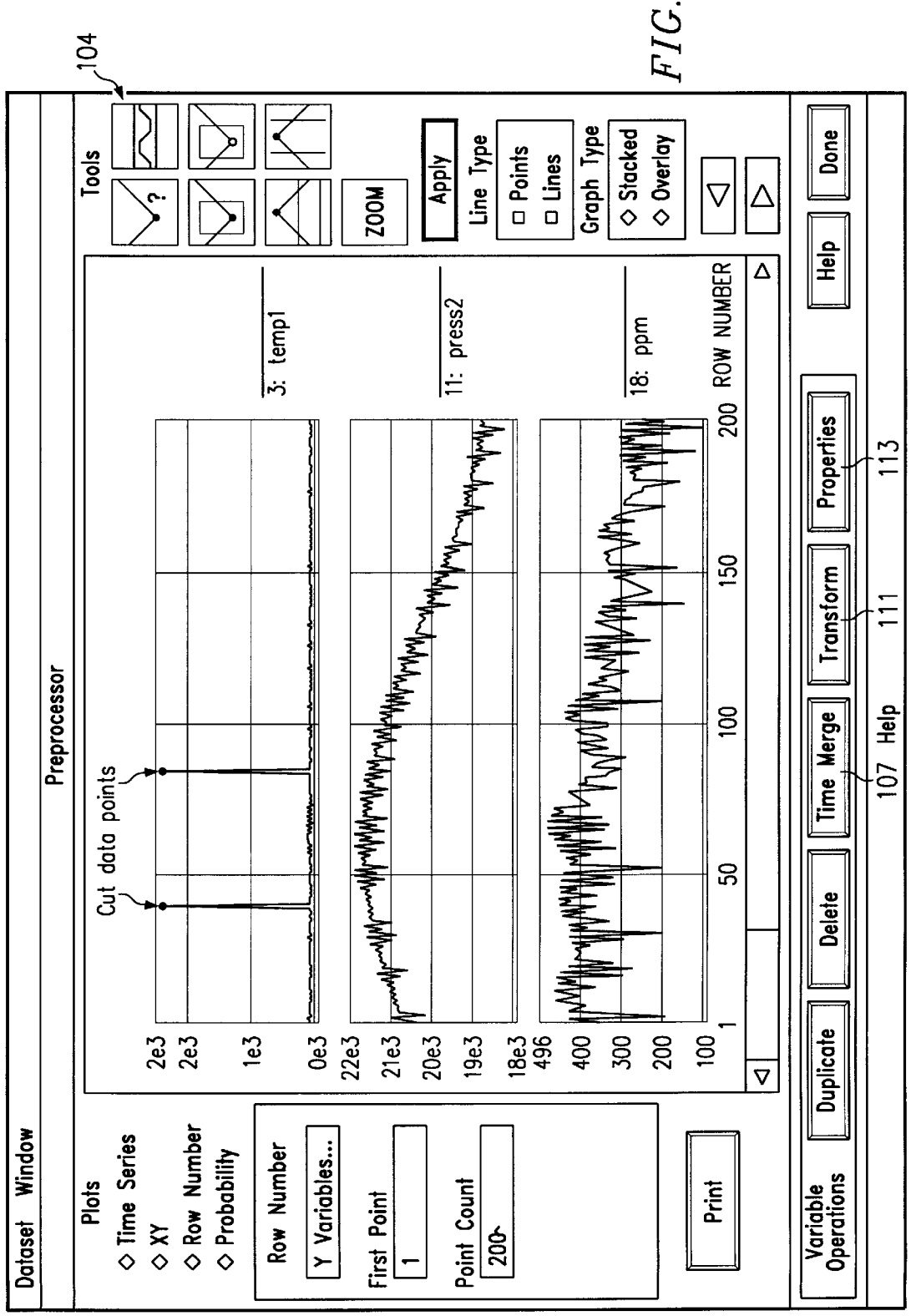
Figure 7D:
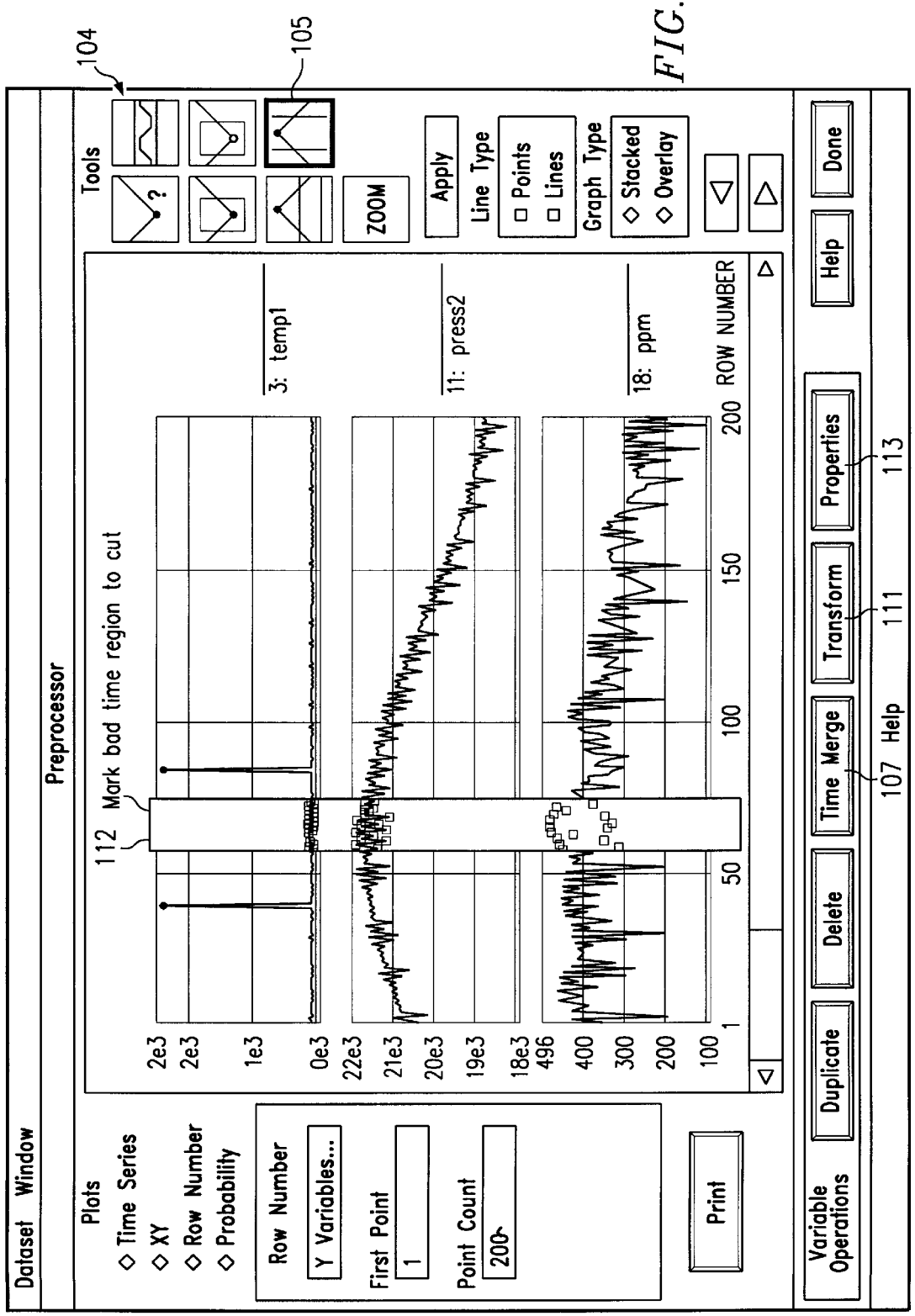
Figure 7E:
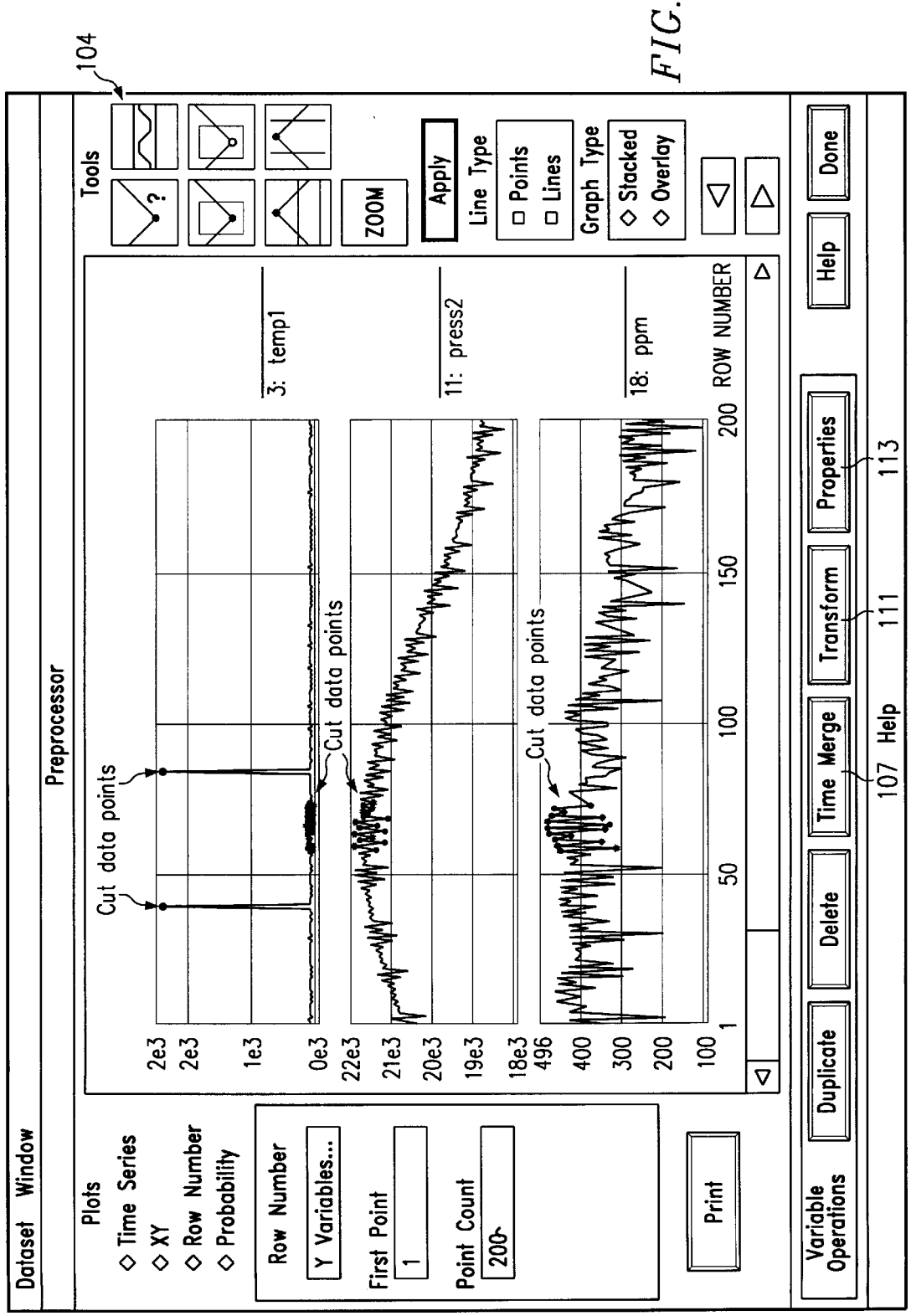
Figure 7F:
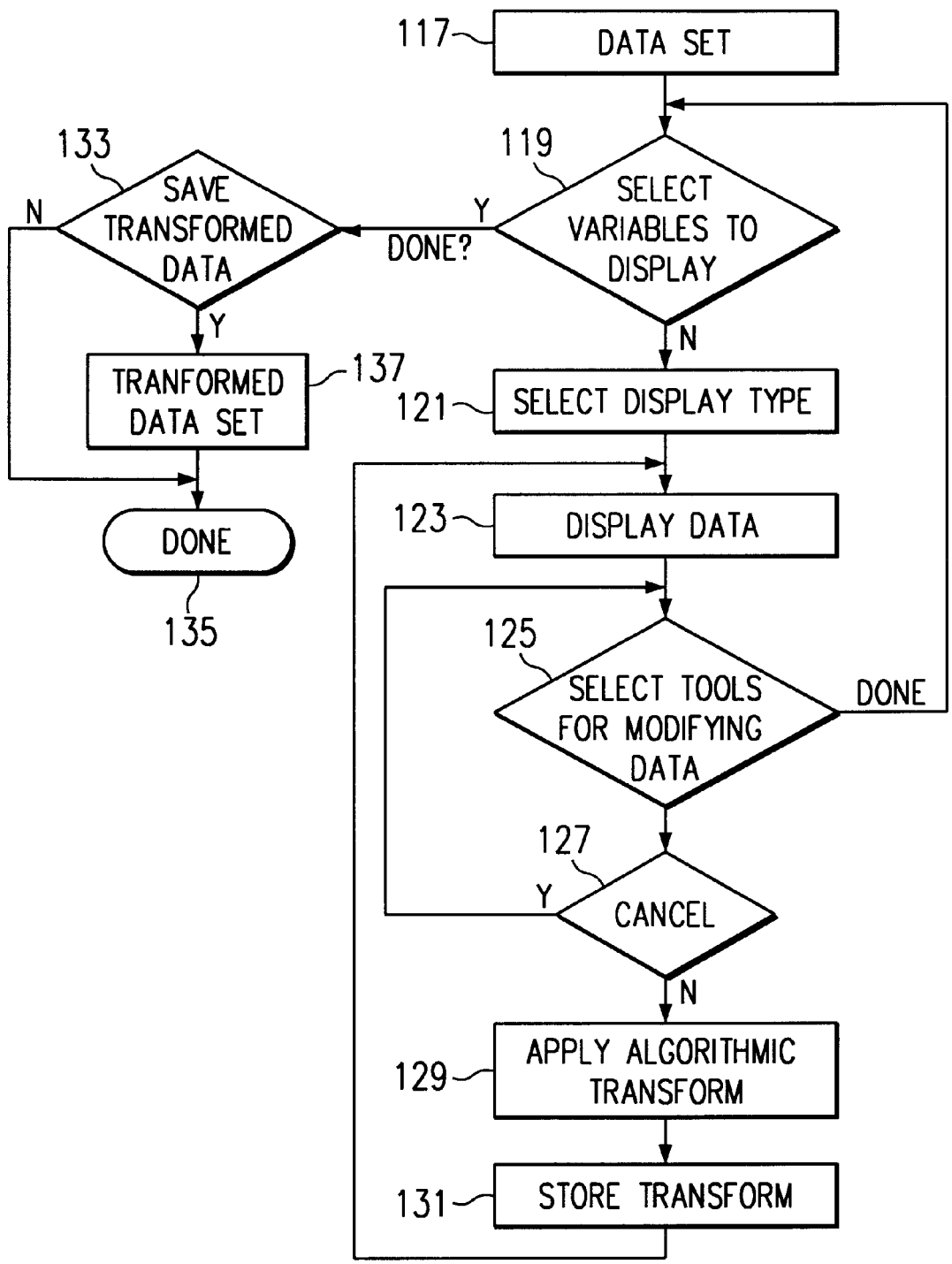

Referring now to FIGS. 7a–7f, there are illustrated three plots of data, one for an input "temp1", one for an input "press2" and one for an output "ppm". The first input relates to a temperature measurement, the second input relates to a pressure measurement and the output data corresponds to a parts per million variations. In the first data set, the temp1 data, there are two points of data 108 and 110, which need to be "cut" from the data, as they are obviously bad data points. These will appear as cut data in the data-set which then must be filled in by the appropriate time merge operation utilizing extrapolation, interpolation, etc. techniques. FIG. 7a shows the raw data. FIG. 7b shows the use of the cut data region tool 115. FIG. 7b shows the points 108 and 110 highlighted by dots showing them as cut data points. On a color screen, these dotes appear as red. FIG. 7d shows a vertical cut of the data, cutting across several variables simultaneously. Applying this causes all of the data points to be marked as cut, as shown in FIG. 7e. FIG. 7f shows a flowchart of the steps involved in cutting or otherwise modifying the data. Additionally, a region of data could be selected, which is illustrated by a set of boundaries 112, which results are utilized to block out data. For example, if it were determined that data during a certain time period was invalid due to various reasons, this data could be removed from the data sets, with the subsequent preprocessing operable to fill in the "blocked" or "cut" data.

In the preferred embodiment, the data is displayed as illustrated in FIGS. 7a–7f, and the operator allowed to select various processing techniques to manipulate the data via various cutting, clipping and viewing tools 109, 111, 113, that allow the user to select data items to cut, clip, transform or otherwise modify. In one mode, the mode for removing data, this is referred to as a manual manipulation of the data. However, algorithms can be applied to the data to change the value of that data. Each time the data is changed, it is rearranged in the spreadsheet format of the data. As this operation is being performed, the operator can view the new data.

With the provisions of the various clipping and viewing tools 107, 109, 111 and 113, the user is provided the ability to utilize a graphic image of data in a database, manipulate the data on a display in accordance with the selection of the various cutting tools and modify the stored data in accordance with these manipulations. For example, a tool could be utilized to manipulate multiple variables over a given time range to delete all of that data from the input database and reflect it as "cut" data. This would act similar to a situation wherein a certain place in the data set had missing data, which would require a data reconciliation scheme in order to reproduce this data in the input data stream. Additionally, the data can be "clipped"; that is, a graphical tool can be utilized to determine the level at which all data above that level is modified to. All data in the data set, even data not displayed, can then be modified to this level. This in effect constitutes applying an algorithm to that data set.

In FIG. 7f, the flowchart depicts the operation of utilizing the graphical tools for cutting data. An initiation block, block 117 indicates the acquisition of the data set. The program then flows to a decision block 119 to determine if the variables have been selected and manipulated for display. If not, the program flows along an "N" path to a function block 121 to select the display type and then to a function block 123 to display the data in the desired format. The program then flows to a decision block 125 to indicate the operation wherein the tools for modifying the data are selected. When this is done, the program flows along a "DONE" line back to the output of decision block 119 to determine if all of the variables have been selected. However, if the data is still in the modification stage, the program flows to a decision block 127 to determine if an operation is cancelled and, if so, flows back around to the input of decision block 125. If the operation is not cancelled, the program flows along an "N" path to a function block 129 to apply the algorithmic transformation to the data and then to a function block 131 to store the transform as part of a sequence. The program then flows back to the input of function block 123. This continues until the program flows along the "DONE" path from decision block 125 back to the input of decision block 119.

Once all the variables have been selected and displayed, the program flows from decision block 119 along a "Y" path to the input of a decision block 133 to determine if the transformed data is to be saved. If not, the program flows along an "N" path to a "DONE" block 135 and, if not, the program flows from the decision block 133 along the "Y" path to a function block 137 to transform the data set and then to the "DONE" block 135.

Figure 8:
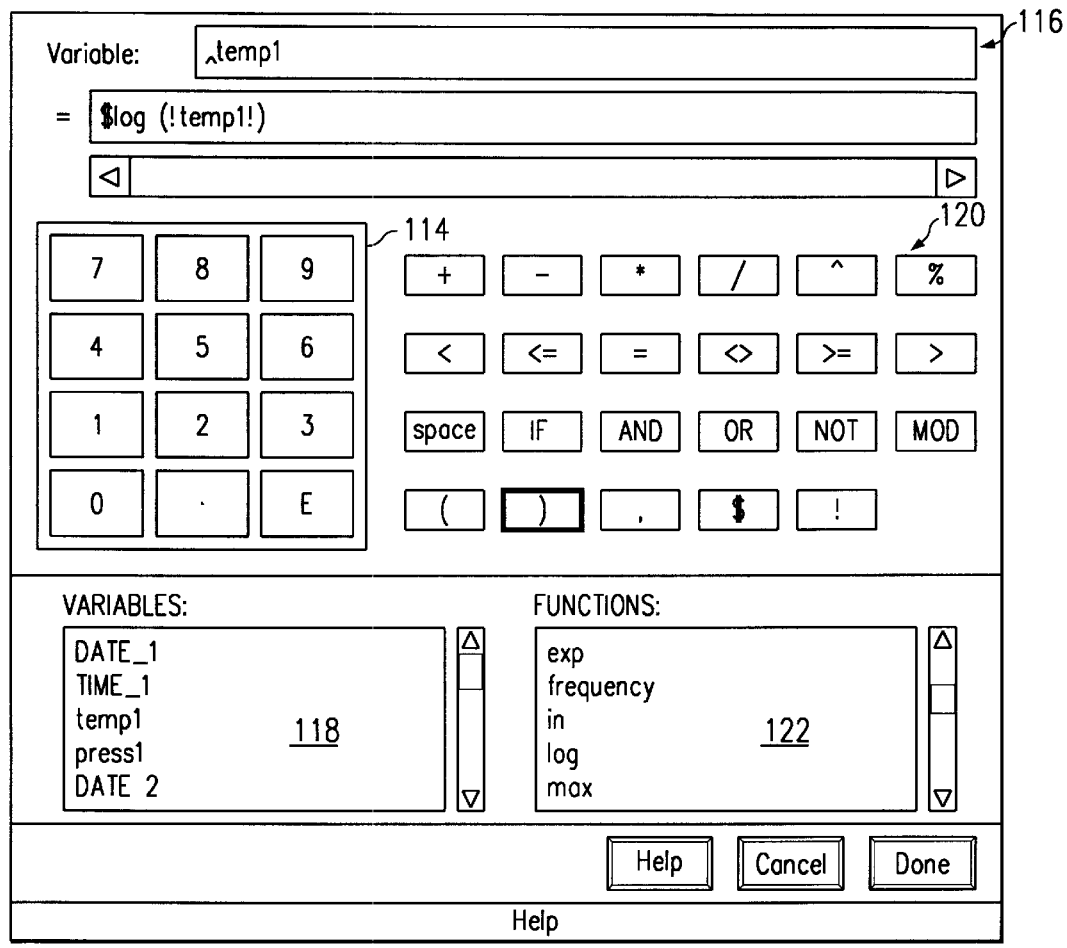
FIG. 8 illustrates the display for the algorithm selection operation.

Referring now to FIG. 8, there is illustrated a diagrammatic view of the display for performing the algorithmic functions on the data. The operator merely has to select this display, which display is comprised of a first numerical template 114, that provides a numerical keypad function. A window 116 is provided that displays the variable that is being operated on. The variables that are available are illustrated in a window 118 which illustrates the various variables. In this example, the various variables are arranged in groups, one group illustrating a first date and time and a second group illustrated by a second date and time. This is prior to time merging. The illustrated window 118 has the variables temp1 and press1 and the variable press2, it being noted that press2 is on a different time scale than temp1. A mathematical operator window 120 is provided that provides the various mathematical operators such as "+", "−", etc. Various logical operators are also available in the window 120. A function window 122 is provided that allows selection of various mathematical functions, logical functions, etc.

In the example illustrated in FIG. 8, the variable temp1 is selected to be processed and provide the logarithmic function thereof. In this manner, the variable temp1 is first selected from window 118 and then the logarithmic function "LOG" is selected from the window 122. The left parentheses is then selected, followed by the selection of the variable tempt from window 118 and then followed by the selection of the right parentheses from window 120. This results in the selection of an algorithmic process which comprises a logarithm of the variable temp1. This is then stored as a sequence, such that upon running the data through the run time sequence, data associated with the variable temp1 has the logarithmic function applied thereto prior to inputting to the run time system model 26. This operation can be continued for each operation.

After the data has been manually preprocessed as described above with reference to FIGS. 7a–7f, the resultant data would be as depicted in Table 1. It can be seen in Table 1 that there is a time scale difference, one group being illustrated with respect to the time TIME_1 and one group associated with the column TIME_2. It can be seen that the first time scale is on an hourly interval and that the second time scale is on a two hour interval. Although "cut" data is not illustrated, it would appear as missing data.

present case, a one-hour time-scale was selected and the box-car algorithm of merging was used.

After time merge, the time scale is disposed on an hourly interval with the time merge process. This is illustrated in Table 3, wherein all of the data is now on a common time scale and the cut data has been extrapolated to insert new data therefor. This is illustrated in Table 3.

TABLE 1

| Name Row | DATE_1 Col 1 | TIME_1 Col 2 | temp1 Col 3 | press1 Col 4 | DATE_2 Col 5 | TIME_2 Col 6 | flow1 Col 7 | temp2 Col 8 |
|---|---|---|---|---|---|---|---|---|
| 36 | 1/2/92 | 12:00:59 | 81.87 | 1552.80 | 1/3/92 | 23:00:59 | 1211.00 | 276.95 |
| 37 | 1/2/92 | 13:00:59 | 58.95 | 1489.19 | 1/4/92 | 01:00:59 | 1210.90 | 274.44 |
| 38 | 1/2/92 | 14:00:59 | 83.72 | 1558.00 | 1/4/92 | 3:00:591 | 1211.09 | 277.38 |
| 39 | 1/2/92 | 15:00:59 | 53.72 | 1474.40 | 1/4/92 | 5:01:00 | 1210.69 | 274.01 |

After the data has been manually preprocessed, the algorithmic processes are applied thereto. In the example described above with reference to FIG. 8, the variable tempt was processed by taking a logarithm thereof. This would result in a variation of the set of data associated with the variable temp1. This is illustrated in Table 2.

TABLE 2

| Name Row | DATE_1 Col 1 | TIME_1 Col 2 | temp1 Col 3 | press1 Col 4 | DATE_2 Col 5 | TIME_2 Col 6 | flow1 Col 7 | temp2 Col 8 |
|---|---|---|---|---|---|---|---|---|
| 36 | 1/2/92 | 12:00:59 | 1.91 | 1552.80 | 1/3/92 | 23:00:59 | 1211.00 | 276.95 |
| 37 | 1/2/92 | 13:00:59 | 1.77 | 1489.19 | 1/4/92 | 01:00:59 | 1210.90 | 274.44 |
| 38 | 1/2/92 | 14:00:59 | 1.92 | 1558.00 | 1/4/92 | 3:00:591 | 1211.09 | 277.38 |
| 39 | 1/2/92 | 15:00:59 | 1.73 | 1474.40 | 1/4/92 | 5:01:00 | 1210.69 | 274.01 |

The sequence of operation associated therewith would define the data that was cut out of the original data set for data temp1 and also the algorithmic processes associated therewith, these being in a sequence which is stored in the sequence block 14 and which may be examined via the data-column properties module 113, shown as follows:

markcut(temp1, 1,2068,920.844325,160000000000000000000000.000000)
markcut(temp1, 1,58,73,-160000000000000000000.0000001,600000000000000000000
$log(temp1)

To perform the time merge, the operator selects the time merge function 115, illustrated in FIGS. 7a–7f, and specifies the time scale and type of time merge algorithm. In the

TABLE 3

| Name Row | Date | time Col 1 | temp1 Col 2 | press1 Col 3 | flow1 Col 4 | temp2 Col 5 | press2 Col 6 | flow2 Col 7 |
|---|---|---|---|---|---|---|---|---|
| 36 | 1/2/92 | 12:00:00 | 1.87 | 1530.00 | 1211.69 | 274.50 | 2160.00 | 533.29 |
| 37 | 1/2/92 | 13:00:00 | 1.87 | 1530.00 | 1211.69 | 274.50 | 2160.00 | 533.29 |
| 38 | 1/2/92 | 14:00:00 | 1.87 | 1530.00 | 1211.69 | 274.50 | 2160.00 | 533.29 |
| 39 | 1/2/92 | 15:00:00 | 1.87 | 1530.00 | 1211.69 | 274.50 | 2160.00 | 533.29 |

The sequence after time merge will include the data that is cut from the original data sets, the algorithmic processes utilized during the pre-time merge processing and the time merge data. This is illustrated as follows:

```
markcut(temp1, 1,2068,938.633160,1600000000000000000000.000000)
markcut(temp1, 57,71,-1600000000000000000000.0000001,6000000000000000000
$log(temp1)
tmerge(temp1, time, 0,16666666663417741312.000000)
```

After the time merge operation, additional processing can be utilized. To perform this, the display of FIG. 8 is again pulled up, and the algorithmic process selected. One example would be to take the variable temp1 after time merge and add a value of 5000 to this variable. This would result in each value in the column associated with the variable temp1 being increased by that value. This would result in the data in Table 4.

TABLE 4

| Name Row | Date | time Col 1 | temp1 Col 2 | press1 Col 3 | flow1 Col 4 | temp2 Col 5 | press2 Col 6 | flow2 Col 7 |
|---|---|---|---|---|---|---|---|---|
| 36 | 1/2/92 | 12:00:00 | 5001.87 | 1530.00 | 1211.69 | 274.50 | 2160.00 | 533.29 |
| 37 | 1/2/92 | 13:00:00 | 5001.87 | 1530.00 | 1211.69 | 274.50 | 2160.00 | 533.29 |
| 38 | 1/2/92 | 14:00:00 | 5001.87 | 1530.00 | 1211.69 | 274.50 | 2160.00 | 533.29 |
| 39 | 1/2/92 | 15:00:00 | 5001.87 | 1530.00 | 1211.69 | 274.50 | 2160.00 | 533.29 |

The sequence would then be updated with the following sequence:

```
markcut(temp1, 1,2068,938.633160,160,1600000000000000000000.000000)
markcut(temp1, 57,71,-1600000000000000000000.0000001.600000000000000000000)
$log(temp1)
tmerge (temp1, time, 0, 16666666663417741312.0000000)
temp1+5000
```

Figure 9:
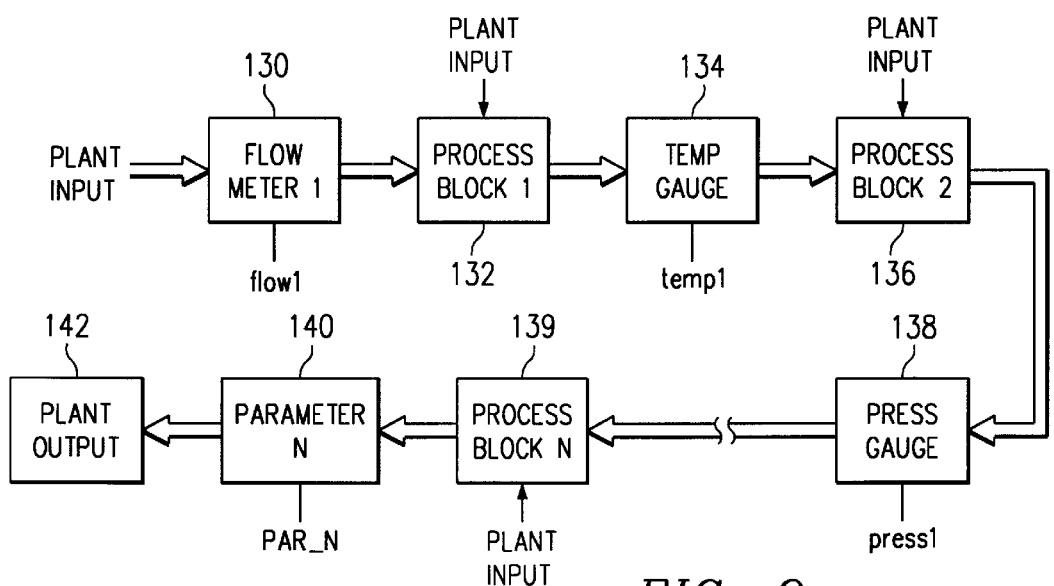
FIG. 9 illustrates a block diagram of a plan depicting the various places in the process flow that parameters occur relative to the plant output.

Referring now to FIG. 9, there is illustrated a block diagram of the process flow through a plant. There is a general flow input to the plant which is monitored at some point by flow meter 130, the flow meter 130 providing a variable output flow1. The flow continues to a process block 132, wherein various plant processes are carried out. The various plant inputs are provided to this process block. The process then flows to a temperature gauge 134 to output a variable temp1. The process then flows to a process block 136 to perform other plant processes, these also receiving plant inputs. The process then flows to a pressure gauge 138, this outputting a variable press1. The process continues with various other process blocks 140 and other parameter measurement blocks 140. This results in an overall plant output 142 which is the desired plant output. It can be seen that numerous processes occur between the output of parameter flow1 and the plant output 142. Additionally, other plant outputs such as press1 and temp1 occur at different stages in the process. This results in delays between a measured parameter and an effect on the plant output.

Figure 10:
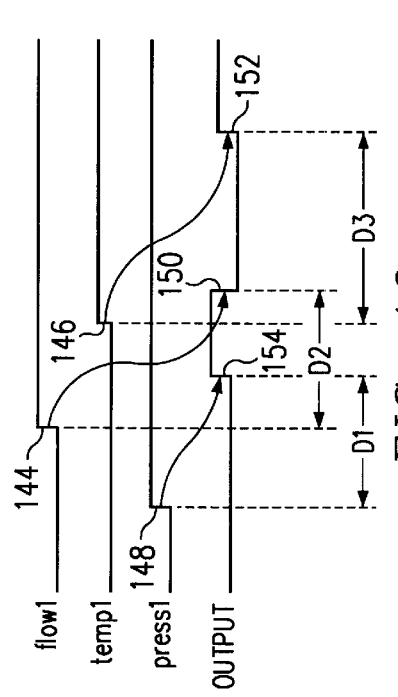
FIG. 10 illustrates a diagrammatic view of the relationship between the various plant parameters and the plant output.

Referring now to FIG. 10, there is illustrated a timing diagram illustrating the various effects of the output variables from the plant and the plant output. The output variable flow1 experiences a change at a point 144. Similarly, the output variable temp1 experiences a change at a point 146 and the variable press1 experiences a change at a point 148. However, the corresponding change in the output is not time synchronous with the changes in the variables. Referring to the diagram labelled OUTPUT, changes in the plant output occur at points 150, 152 and 154, for the respective changes in the variables at points 144–148, respectively. The change between points 144 and 150 and the variable flow1 and the output, respectively, experience a delay D2. The change in the output of point 152 associated with the change in the variable temp1 occurs after delay D3. Similarly, the change in the output of point 154 associated with the change in the variable press1 occurs after a delay of D1. In accordance with one aspect of the present invention, these delays are accounted for during training, and, subsequently, during the run time operation, these delays are also accounted for.

Figure 11:
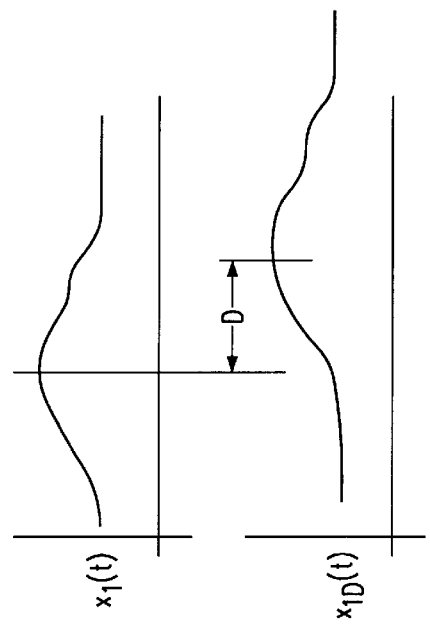
FIG. 11 illustrates a diagrammatic view of the delay provided for input data patterns.

Referring now to FIG. 11, there is illustrated a diagrammatic view of the delay for a given input variable $x_1(t)$. It can be seen that a delay D is introduced to the system to provide an output $x_{1D}(t)$ such that $x_{1D}(t)=x_1(t-D)$, this output is then input to the network. As such, the measured plant variables now coincide in time with the actual effect that is realized in the measured output such that, during training, a system model can be trained with a more accurate representation of the system.

Figure 12:
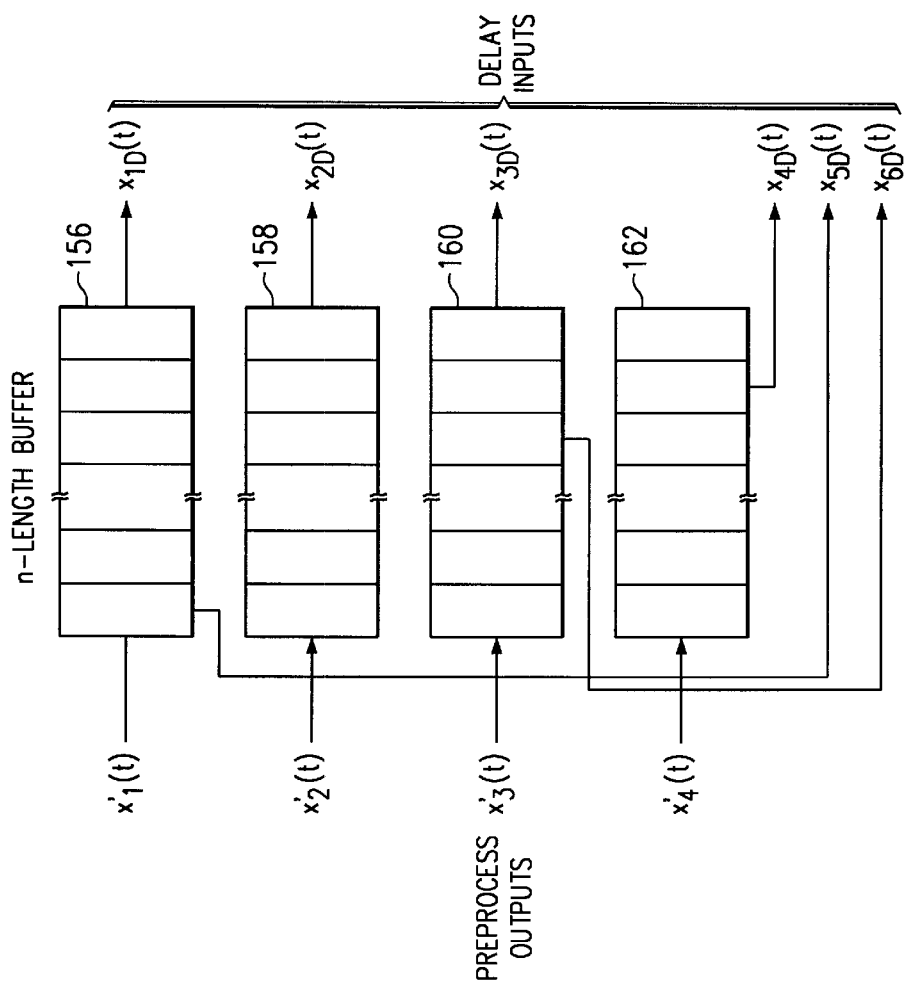
FIG. 12 illustrates a diagrammatic view of the buffer formation for each of the network inputs and the method for generating the delayed network input.

Referring now to FIG. 12, there is illustrated a diagrammatic view of the method of the preferred embodiment for implementing the delay. Rather than provide an additional set of data for each delay that is desired, $x(t+\tau)$, variable length buffers are provided in each data set after preprocessing, the length of which corresponds to the longest delay. Multiple taps are provided in each of the buffers to allow various delays to be selected. In FIG. 12, there are illustrated four buffers 156, 158, 160 and 162, associated with the preprocessed inputs $x_1'(t)$, $x_s'(t)$, $x_3'(t)$ and $x_r'(t)$. Each of the buffers has a length of N, such that the first buffer outputs the delay input $x_{1D}(t)$, the second buffer 158 outputs the delay input $x_{2D}(t)$ and the buffer 160 outputs the delay input $X_{3D}(t)$. The buffer 162, on the other hand, has a delay tap that provides for a delay of "n−1" to provide an output $x_{4D}(t)$. An output $x_{5D}(t)$ is provided by selecting the first tap in the buffer 156 such that the relationship $x_{5D}(t)=x_1'(t+1)$.

Additionally, the delayed input $x_{6D}(t)$ is provided which is selected as a tap output of the buffer 160 with a value of $\tau=2$. This results in the overall delay inputs to the training model 20. Additionally, these delays are stored as delay settings for use during the run time.

Figure 13:
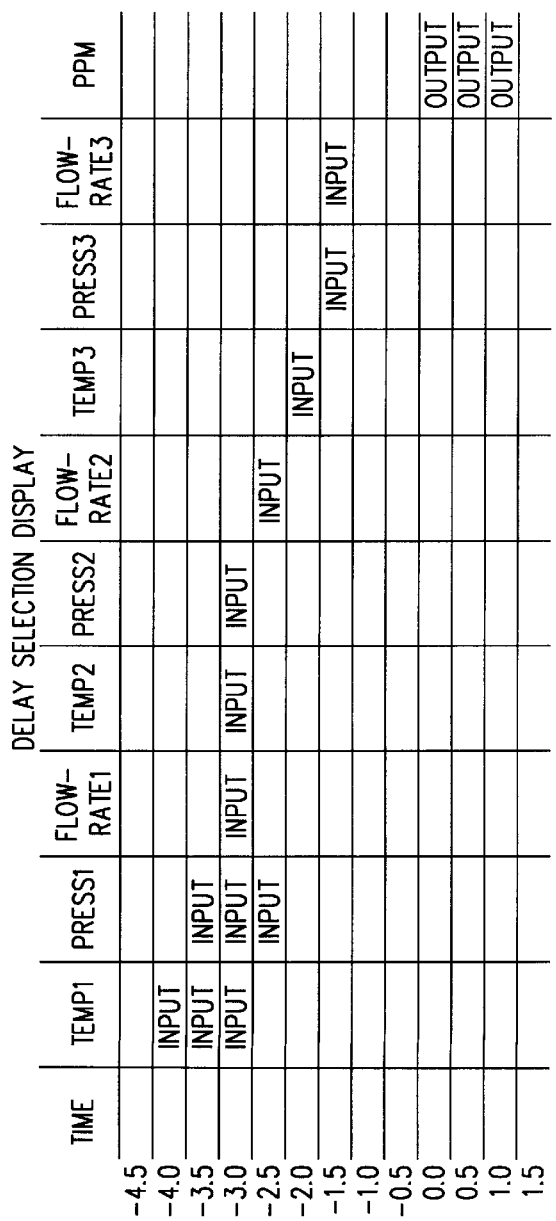
FIG. 13 illustrates the display for selection of the delays associated with various inputs and outputs in the neural network model.

Referring now to FIG. 13, three is illustrated a display that is provided to the operator for selecting the various delays to be applied to the input variables and the output variables utilized in training. In this example, it can be seen that by selecting a delay for the variable temp1 of −4.0, −3.50 and −3.00, three separate input variables have not been selected for input to the training model 20. Additionally, three separate outputs have been selected, one for delay 0.00, one for a delay 0.50 and one for a delay of 1.00 to predict present and future values of the variable. Each of these can be processed to vary the absolute value of the delays associated with the input variables. It can therefor be seen that a maximum buffer of −4.0 for an output of 0.00 will be needed in order to provide for the multiple taps. Further, it can be see that it is not necessary to completely replicate the data in any of the delayed variable columns as a separate column, thus increasing the amount of memory utilzed.

Figure 14:
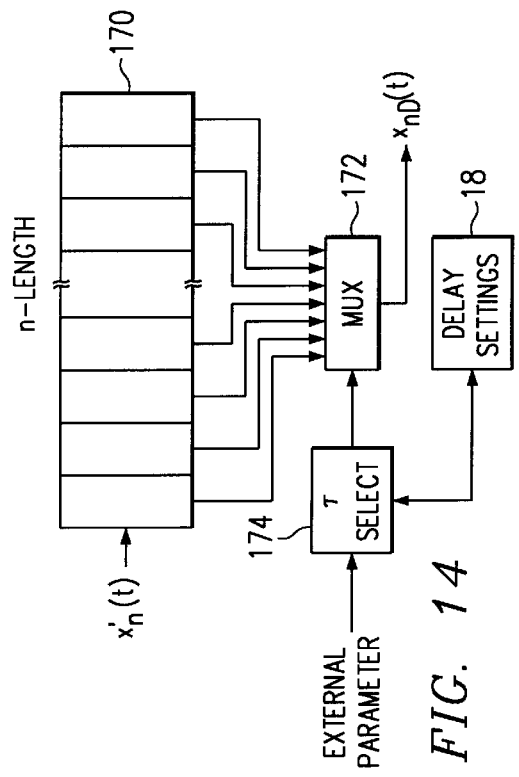
FIG. 14 illustrates a block diagram for a variable delay selection.

Referring now to FIG. 14, there is illustrated a block diagram for generating process dependent delays. A buffer 170 is illustrated having a length of N, which receives an input variable $x_n'(t)$ from the preprocessor 12 to provide on the output thereof an output $x_{nD}(t)$ as a delayed input to the training model 20. A multiplexer 172 is provided which has multiple inputs, one from each of the n buffer registers with a τ-select circuit 174 provided for selecting which of the taps to output. The value of τ is a function of other variables parameters such as temperature, pressure, flow rates, etc. For example, it may have been noted empirically that the delays are a function of temperature. As such, the temperature relationship could be placed in,the block 74 and then the external parameters input and the value of τ utilized to select the various taps input to the multiplexer 172 for output therefrom as a delay input. The system of FIG. 14 can also be utilized in the run time operation wherein the various delay settings and functional relationships of the delay with respect to the external parameters are stored in the storage area 18. The external parameters can then be measured and the value of τ selected as a function of this temperature and the functional relationship provided by the information stored in the storage area 18. This is to be compared with the training operation wherein this information is externally input to the system. For example, with reference to FIG. 13, it could be noticed that all of the delays for the variable temp1 must be shifted up by a value of 0.5 when the temperature reached a certain point. With the use of the multiple taps, as described with respect to FIGS. 12 and 14, it is only necessary to vary the value of the control input to the multiplexers 172 associated with each of the variables, it being understood that in the example of FIG. 13, three multiplexers 172 would be required for the variable temp1, since there are three separate input variables.

Figure 15A:
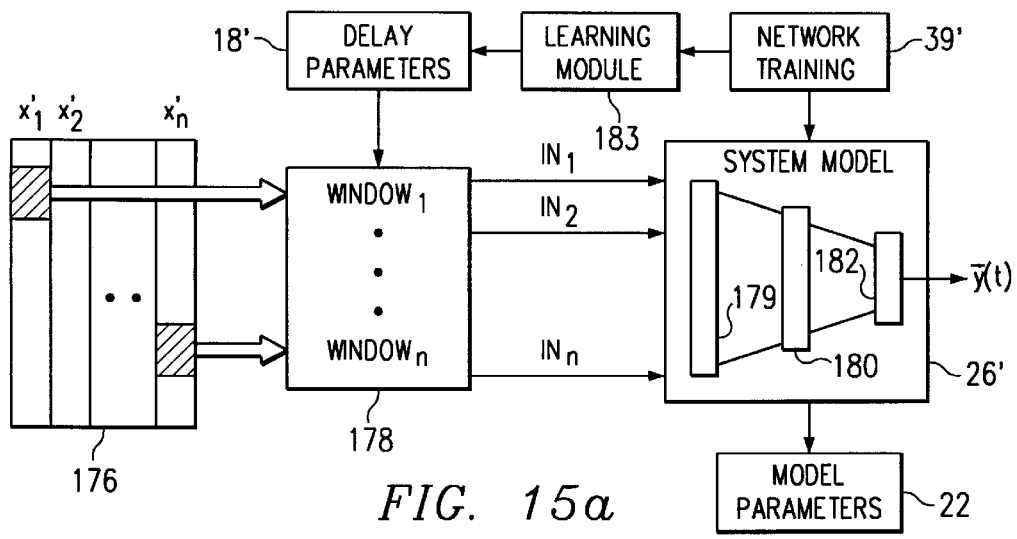
FIG. 15a illustrates a block diagram of the adaptive determination of the delay.

Referring now to FIG. 15a, there is illustrated a block diagram of the preprocessing system for setting the delay parameters, which delay parameters are learned. For simplicity purposes, the preprocessing system is not illustrated; rather, a table 176 of the preprocess data is illustrated. Further, the method for achieving the delay differs somewhat, as will be described hereinbelow. The delay is achieved by a time delay adjustor 178, which time delay adjustor utilizes the stored parameters in a delayed parameter block 18'. The delay parameter block 18' is similar to the delay setting block 18, with the exception that absolute delays are not contained therein. Rather, information relating to a window of data is stored in the delay parameter block 18'. The time delay adjustor 178 is operable to select a window of data within in each set of data in the table 176, the data labelled $x_1'$ through $x_n'$. The time delay adjustor 178 is operable to receive data within a defined window associated with each of the sets of data $x_1'-x_n'$ and convert this information into a single value for output therefrom as an input value $in_1-in_n$. These are directly input to a system model 26', which system model 26' is similar to the run-time system model 26 and the training model 20 in that it is realized with a non-linear neural network. The non-linear neural network is illustrated as having an input layer 179, a hidden layer 180 and an output layer 182. The hidden layer 180 is operable to map the input layer 179 to the output layer 182, as will be described hereinbelow. However, note that this is a non-linear mapping function. By comparison, the time delay adjustor 178 is operable to linearly map each of sets of data $x_1'-x_n'$ in the table 176 to the input layer 179. This mapping function is dependent upon the delay parameters in the delay parameter block 18'. As will be described hereinbelow, these parameters are learned under the control of a learning module 183, which learning module 183 is controlled during the network training in the training mode. It is similar to that described above with respect to FIG. 1a.

During learning, the learning module 183 is operable to control both the time delay adjustor block 178 and the delay parameter block 18' to change the values thereof in training of the system model 26'. During training, target outputs are input to the output layer 182 and a set of training data input thereto in the form of the chart 176, it being noted that this is already preprocessed in accordance with the operation as described hereinabove. The model parameters of the system model 26' stored in the storage area 22 are then adjusted in accordance with a predetermined training algorithm to minimize the error. However, the error can only be minimized to a certain extent for a given set of delays. Only by setting the delays to their optimum values will the error be minimized to the maximum extent. Therefore, the learning module 183 is operable to vary the parameters in the delay parameter block 18' that are associated with the timing delay adjustor 178 in order to further minimize the error.

Figure 15B:
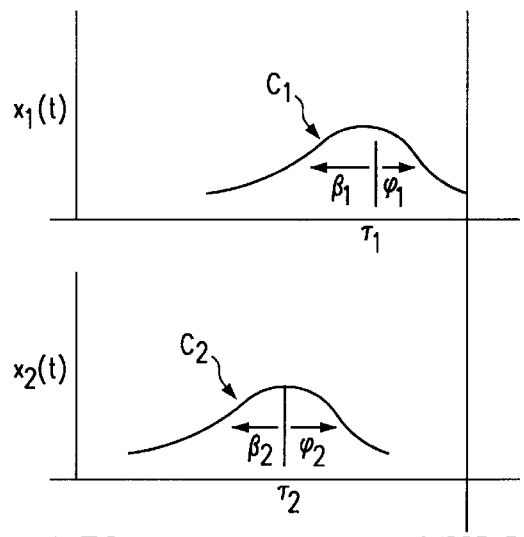
FIG. 15b illustrates examples of the time-delay functions used in adaptive or variable time-delay modes.

Since direct targets for the time delays are not readily available, some measure for adjusting them through indirect targets is required. In FIG. 15b, the time delay adjustor utilizes a window that provides a weighted distribution from a center time delay extending outward therefrom. Illustrated are waveforms for $x_1(t)$ and $x_2(t)$. The waveform is defined as $C_i(\tau_i, \alpha_i, \beta_i)$. Therefore, each of the data columns is parameterized via three numbers, the time lag value $\tau_i$, the leading edge time-rise width $\alpha_i$ and the trailing edge width $\beta_i$. The inputs to the neural network representing the system model 26' would then be the convolution of this time-lag window and the data from the taps from the associated column. The input value would be as follows:

$$in_i(t) = \int_{t'=0}^{t'=t} C_i(t'-t, x_i(t'), \tau_i, \alpha_i, \beta_i) dt' \tag{5}$$

Or, the discretely:

$$in_i(t) = \sum_{j=0}^{j=t} C_i(j'-t, x_i(j), \tau_i, \alpha_i, \beta_i) \tag{6}$$

where, e.g., $$C_i(j' - t, x_i(j), \tau_i, \alpha_i, \beta_i) = e^{-((j'-t)-\tau_i)^2/2\frac{(d_i+\beta_i)}{2^2}} \quad (7)$$

Equation 4 represents a Gaussian window. Given this function for each of the inputs, the network can then learn on the parameters $\tau_i, \alpha_i$ and $\beta_i$.

To achieve the above learning, an error function is required. This error function utilizes the neural network error function as follows:

$$E = \sum_{j=0}^{N_{pats}} (\vec{y}(j) - \vec{o}(j))^2 \quad (8)$$

where the value y(j) is the target of the network and the value o(j) is the output of the net and $N_{PATS}$ is the number of training patterns. The output of the network is dependent on several parameters:

$$O_i(j)) = O_i(j, W_{k1}, in(j)) = O_i(j, W_{k1}, C_i(j, \tau_i, \alpha_i, \beta_i)) \quad (9)$$

where, $W_{k1}$ is the matrix of neural network weights, learned by gradient descent:

$$\Delta W_{ki} = -\eta \frac{\partial E}{\partial W_{ki}} \quad (10)$$

and $C_i$ is the convolution window with parameters $\tau_i$, $\alpha_i$ and $\beta_i$ are also learned by gradient descent; that is:

$$\Delta \tau_i = -\eta \frac{\partial E}{\partial T_i} \quad \tau_i \geq 0 \quad (11)$$

$$\Delta \alpha_i = -\eta_\alpha \frac{\partial E}{\partial \alpha_i} \quad \alpha_i \geq 0 \quad (12)$$

$$\Delta \beta_i = -\eta_\beta \frac{\partial E}{\partial \beta_i} \quad \beta_i \geq 0 \quad (13)$$

where $\eta_w$, $\eta_\tau$, $\eta_\alpha$ and $\eta_\beta$ are learning rates usually chosen such that $\tau_i$, $\alpha_i$ and $\beta_i$ adjust more slowly than $W_{k1}$. That is, $\eta_w$ is approximately equal to ten times the value of $\eta_\tau$ and $\eta_\tau$ is approximately equal to $\eta_\alpha$ and is approximately equal to $\eta_\beta$. This learning will allow the network to find the best $\tau_i$, $\alpha_i$ and $\beta_i$ to maximize the model fit and therefore minimize error.

Figure 16:
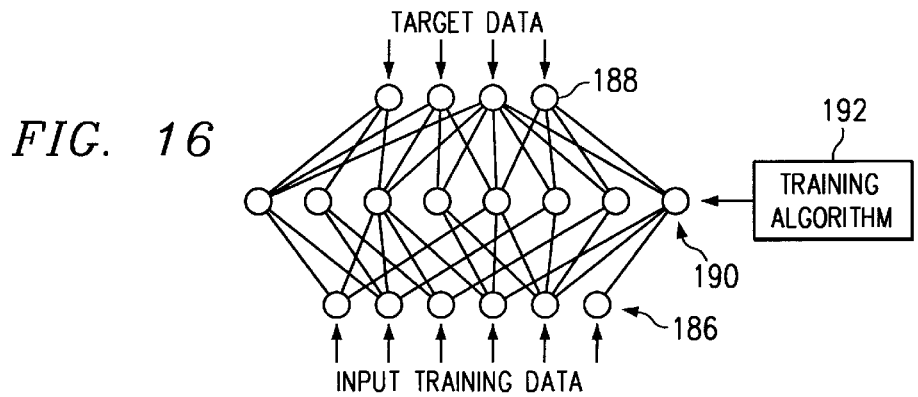
FIG. 16 illustrates a diagrammatic view of a conventional multi-layer neural network.

Referring now to FIG. 16, there is illustrated a schematic view of a conventional neural network utilized for the training model 20 and for the run time system model 26. The neural network is a multi-layer network comprised of a plurality of input nodes 186 and a plurality of output nodes 188. A plurality of hidden nodes 190 are provided which are interconnected through a first interconnection layer, the input interconnection layer, to the input layer nodes 186. Each of the hidden nodes in layer 190 may have a separate weighted connection to each of the nodes in the input layer 186, or select ones thereof. Similarly, an output interconnection layer is provided between the hidden layer 190 and the output layer 188 such that each of the hidden nodes 190 is connected through a weighted interconnection to each of the output nodes 188 or select ones thereof. The weighted interconnections and the values thereof define the stored representation, and these weights are the values that are learned during the training operation. In general, the learning operation comprises target data input to the output nodes 188, which are utilized for a compare operation and then a training algorithm, such as a back propagation technique is utilized, as illustrated by block 192. This is a conventional type of architecture. As will be described hereinbelow, this network is trained through any one of a number of training algorithms and architectures such as Radial Basis Functions, Gaussian Bars, or conventional Backpropagation techniques. The Backpropagation learning technique is generally described in D. E. Rumelhart, G. E. Hinton & R. J. Williams, *Learning Internal Representations by Error Propagation* (in D. E. Rumelhart & J. L. McClennand, *Parallel Distributed Processing*, Chapter 8, Vol. 1, 1986), which document is incorporated herein by reference. In this type of algorithm, a set of training data is input to the input layer 186 to generate an output, which output in the output layer 188 is then compared to the target data. An error is then generated, and this error back propagated from the output layer 188 to the input layer 186 with the values of the weights on the input interconnect layer and the output interconnect layer changed in accordance with the gradient descent technique. Initially, the error is very large, but as training data is sequentially applied to the input, and this compared to corresponding target output data, the error is minimized. If sufficient data is provided, the error can be minimized to provide a relatively accurate representation of the system.

Referring now to FIG. 17, there is illustrated a flowchart illustrating the determination of time delays for the training operation. This flowchart is initiated at a block 198 and then flows to a function block 200 to select the delays, this performed by the operator as described above with respect to FIG. 13. The program then flows to a decision block 202 to determine whether variable rs are to be selected. The program flows along a "Y" path to a function block 204 to receive an external input and vary the value of τ in accordance with the relationship selected by the operator, this being a manual operation in the training mode. The program then flows to a decision block 206 to determine whether the value of τ is to be learned by an adaptive algorithm. If variable τs are not to be selected in the decision block 202, the program then flows around the function block 204 along the "N" path thereof.

If the value of τ is to be learned adaptively, the program flows from the decision block 206 to a function block 208 to learn the value of τ adaptively. The program then flows to a function block 210 to save the value of τ. If no adaptive learning is required, the program flows from the decision block 206 along the "N" path to function block 210. After the τ parameters have been determined, the model 20 is trained, as indicated by a function block 212 and then the parameters stored, as indicated by a function block 214 and then the program flows to a DONE block 216.

Referring now to FIG. 18, there is illustrated a flowchart depicting the operation in the run time mode. This is initiated at a block 220 and then flows to a function block 222 to receive the data and then to a decision block 224 to determine whether the pre-time merge process is to be entered. If so, the program flows along a "Y" path to a function block 226 and then to a decision block 228. If not, the program flows along the "N" input path to the input of decision block 228. Decision block 228 determines whether the time merge operation is to be performed. If so, the program flows along the "Y" path to function block 230 and then to the input of a decision block 232 and, if not, the program flows along the "N" path to the decision block 232. The decision block 232 determines whether the post-time merge process is to be performed. If so, the program flows along the "Y" path to a function block 234 to process the data with the stored sequence and then to a function block 236 to set the buffer equal to the maximum τ for the delay. If not, the post-time merge process is not selected, the program flows from the decision block 232 along the "N" path thereof to the input of function block 236.

Function block 236 flows to a decision block 238 to determine whether the value of τ is to be varied. If so, the program flows to a function block 240 to set the value of τ variably, then to the input of a function block 242 and, if not, the program flows along the "N" path to function block 242. Function block 242 is operable to buffer data and generate run time inputs and then flows to a function block 244 to load the model parameters. The program then flows to a function block 246 to process the generated inputs through the model and then to a decision block 248 to determine whether all of the data has been processed. If not, the program flows along the "N" path back to the input of function block 246 until all data is processed and then along the "Y" path to return block 250.

Figure 19:
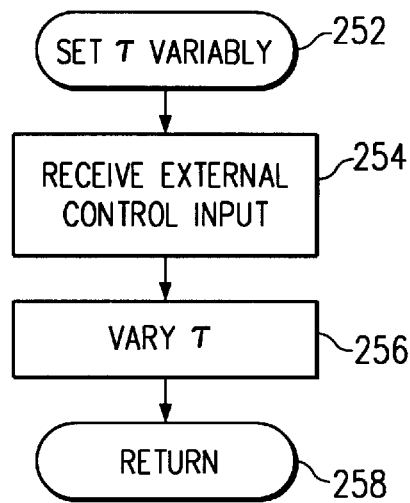
FIG. 19 illustrates a flowchart for setting the value of the variable delay.

Referring now to FIG. 19, there is illustrated a flowchart for the operation of setting the value of τ variably. The program is initiated at a block 252 and then proceeds to a function block 254 to receive the external control input. The value of τ is varied in accordance with the relationship stored in the storage area 14, as indicated by a function block 256 and then the program flows to a function block 258.

Figure 20:
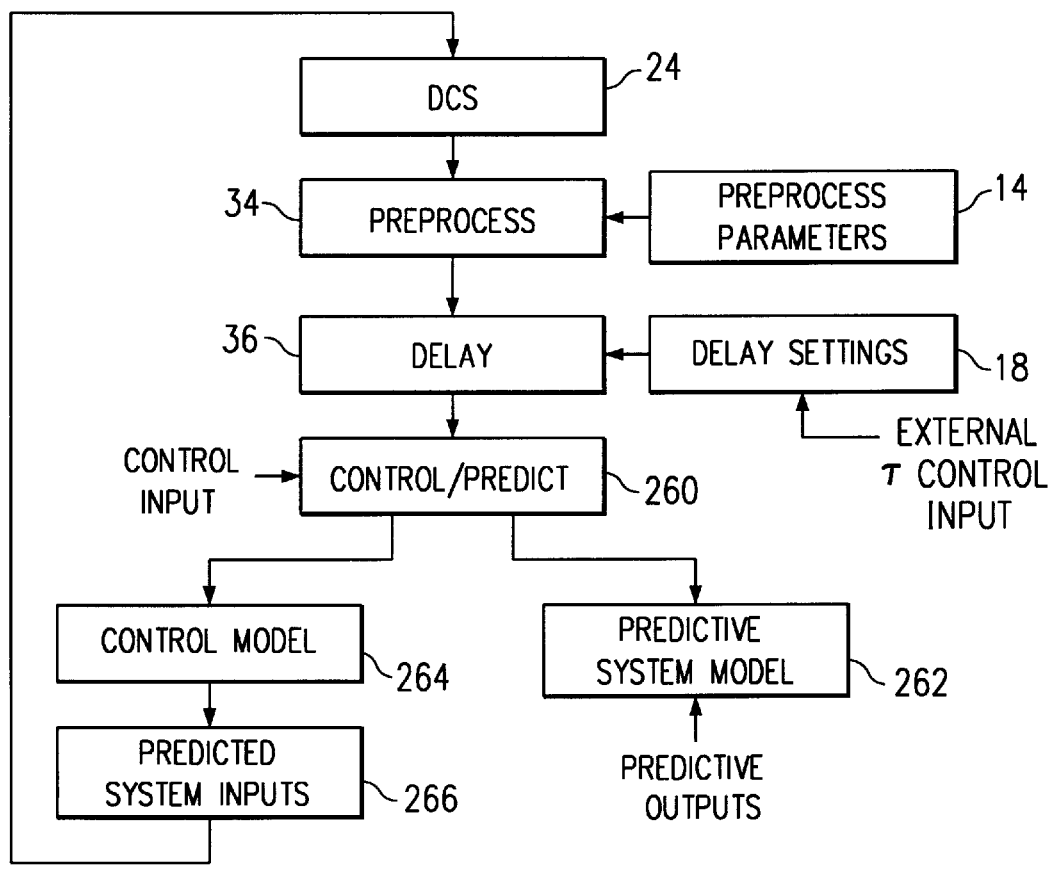
FIG. 20 illustrates a block diagram of the interface of the run time preprocessor with a distributed control system.

Referring now to FIG. 20, there is illustrated a simplified block diagram for the overall run time operation. Data is initially output by the DCS 24 during run time. The data is then preprocessed in the preprocess block 34 in accordance with the preprocess parameters stored in the storage area 14. The data is then delayed in the delay block 36 in accordance with the delay setting set in the delay block 18, this delay block 18 also receiving the external block control input, which is comprised of parameters on which the value of τ depends to provide the variable setting operation that was utilized during the training mode. The output of the delay block is then input to a selection block 260, which receives a control input. This selection block 260 selects either a control network or a prediction network. A predictive system model 262 is provided and a control model 264 is provided. Both models 262 and 264 are identical to the training model 20 and utilize the same parameters; that is, models 262 and 264 have stored therein a representation of the system that was trained in the training model 20. The predictive system model 262 provides on the output thereof a predictive output and the control model 264 provides on the output thereof predicted system inputs for the DCS 24. These are stored in a block 266 and translated to control inputs to the DCS 24.

In summary, there has been provided a predictive network for operating in a runtime mode and in a training mode with a data preprocessor for preprocessing the data prior to input to a system model. The predictive network includes a non-linear network having an input layer, an output layer and a hidden layer for mapping the input layer to the output layer through a representation of a runtime system. Training data derived from the training system is stored in a data file, which training data is preprocessed by a data preprocessor to generate preprocessed training data, which is then input to the non-linear network and trained in accordance with a predetermined training algorithm. The model parameters of the non-linear network are then stored in a storage device for use by the data preprocessor in the runtime mode. In the runtime mode, runtime data is preprocessed by the data preprocessor in accordance with the stored data preprocessing parameters input during the training mode and then this preprocessed data input to the non-linear network, which network operates in a prediction mode. In the prediction mode, the non-linear network outputs a prediction value.

Although the preferred embodiment has been described in detail, it should be understood that various changes, substitutions and alterations can be made therein without departing from the spirit and scope of the invention as defined by the appended claims.

What is claimed is:

1. A system for generating inputs for controlling the operation of a plant, comprising:
   a control system for controlling the plant, and having:
      a control network for generating plant inputs to operate the plant,
      a run time model for receiving inputs and mapping the received inputs through a stored representation of the plant trained on a given set of inputs and outputs to provide on the output predicted control inputs for input to the plant, and
      a run time preprocessor for applying transforms to said inputs from the plant that are input to the run time model which transforms are operable to transform the data to said inputs in a predetermined manner, and
   a transform modification device for modifying the transforms, and the associated predetermined manner in which they operate, in said run time preprocessor with said stored representation in said run time model being fixed, and in accordance with user determined transforms that are applied to said control system during running thereof.

2. The system of claim 1, and further comprising a simulation network for determining said transforms utilized by said run time preprocessor independent of the operation of said control system, and wherein said transform modification device modifies the transforms in said run time preprocessor such that said determined transforms by said simulation network can be applied to said control system during running thereof.

3. The system of claim 2, wherein said simulation network comprises:
   an off-line preprocessor substantially identical to said run time preprocessor;
   a database for storing data representative of data obtained from the plant during running thereof;
   an off-line model substantially similar to said run-time model for receiving inputs from said off-line preprocessor and mapping the received inputs through a stored representation of the plant to an output, the output providing predicted control values representing the predicted control inputs output by said run-time model;
   said off-line preprocessor operable to apply off-line transforms to said received data from said database prior to input to said off-line model; and
   a control system for allowing a user to modify said transforms associated with said off-line preprocessor during operation thereof and wherein said transforms utilized by said off-line preprocessor can be accessed by said transform modification device for application of said off-line transforms to said run-time preprocessor.

4. The system of claim 3, wherein said control system includes a graphical interface for allowing a user to view the operation of said off-line model during operation thereof.

5. The system of claim 4, wherein said run-time model has an input space that is represented by data stored in said database, and said off-line model occupies substantially the same input space, wherein said control system is operable to modify said input space with said transforms, and said transform modification device is operable to translate modifications to the input space of said off-line model directly to the input space of said run-time model via said run-time preprocessor.

6. The system of claim 5, wherein said graphical interface includes a display device for graphically displaying said data in a predetermined format with said control system interfacing with said display device to allow a user to graphically manipulate said input data that represents said input space of said off-line model and to a transform conversion system for converting said graphical manipulation to a transform of said input data prior to input to said off-line model that is utilized by said off-line preprocessor.

7. The system of claim 3, wherein said database contains data obtained from the plant during running thereof.

8. A method for controlling the operation of a plant, comprising:

provide a control system for controlling the plant;

generating plant inputs to operate the plant;

storing a representation of the plant in a run-time model which has inputs for receiving data that corresponds to data input to the plant, which received data on the inputs is mapped through the stored representation of the plant to provide on the output of the run-time model predicted control inputs for input to the control system;

preprocessing in a run-time preprocessing step with a run-time preprocessor the data prior to input to the run-time model by applying transforms to the inputs to the plant that are input to the run-time model which transforms are operable to transform the data to said inputs in a predetermined manner; and modifying the transforms, and the associated predetermined manner in which they operate, in the run-time preprocessing step with the stored representation in the run time model being fixed, and in accordance with user determined transforms, which modified transforms are applied to the control system during the running thereof.

9. The method of claim 8, and further comprising a simulation step of determining the transforms utilized by the run-time preprocessing step independent of the operation of the control system to provide simulated transforms, and wherein the step of modifying the transforms in the run-time preprocessing step comprises utilizing the simulated transforms determined by the simulation step, which transforms are applied to the control system during running thereof.

10. The method of claim 9, wherein the simulating step comprises:

providing an off-line model substantially similar to the run-time model which provides a stored representation of the plant and processes its inputs through the stored representation to provide on the output predicted control values representing the predicted control inputs output by the run-time model;

preprocessing data that is input to the off-line model with an off-line preprocessor in an off-line preprocessing step;

storing data representative of data obtained from the plant during running thereof, this data input to the off-line preprocessor; and modifying the transforms associated with the off-line preprocessor during operation thereof and wherein the transforms utilized by the off-line preprocessor can be accessed by the step of modifying the transforms in the run-time preprocessor.

11. The method of claim 10, and further comprising the step of providing a graphical interface and allowing a user to view the operation of the off-line model during operation thereof.

12. The method of claim 11, wherein the step of providing the run-time model comprises providing a run-time model that has an input space that is represented by data stored in a database, and the step of providing the off-line model comprises providing an off-line model having an input space that occupies substantially the same input space as the run-time model, wherein the step of preprocessing is operable to modify the input space with the transforms, and is operable to translate modifications to the input space of the off-line model directly to the input space of the run-time model via the run-time preprocessor.

13. The model of claim 12, wherein the step of providing a graphical interface, comprises the step of graphically displaying the data on a display device in a predetermined format with the display device interfaced with the control system to allow a user to graphically manipulate the input data that represents the input space of the off-line model and to then convert the graphical manipulation to a transform of the input data prior to input to the off-line model that is utilized with the off-line preprocessor.

* * * * *